US007127676B2

(12) United States Patent
Linsey et al.

(10) Patent No.: US 7,127,676 B2
(45) Date of Patent: Oct. 24, 2006

(54) METHOD AND SYSTEM FOR PROVIDING A SEPARATE BROWSER WINDOW WITH INFORMATION FROM THE MAIN WINDOW IN A SIMPLER FORMAT

(75) Inventors: Terry June Linsey, Acton, MA (US); Charles Robert Hill, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 09/752,962

(22) Filed: Dec. 29, 2000

(65) Prior Publication Data

US 2002/0154172 A1   Oct. 24, 2002

(51) Int. Cl.
*G06F 3/00* (2006.01)
(52) U.S. Cl. .................. 715/738; 715/968; 715/751; 715/760; 715/513; 715/808
(58) Field of Classification Search .............. 345/804, 345/751–760, 764, 781, 705; 715/513, 751–760, 715/764, 781, 705, 738, 968
See application file for complete search history.

(56) References Cited

U.S. PATENT DOCUMENTS

| | | | |
|---|---|---|---|
| 5,894,554 A | 4/1999 | Lowery et al. ........ 395/200.33 |
| 5,910,803 A * | 6/1999 | Grau et al. .................. 345/734 |
| 6,052,730 A | 4/2000 | Felciano et al. ............ 709/225 |
| 6,070,185 A | 5/2000 | Anupam et al. ............ 709/204 |
| 6,081,788 A | 6/2000 | Appleman et al. ............ 705/14 |
| 6,278,449 B1 | 8/2001 | Sugiarto et al. ............ 345/334 |
| 6,314,408 B1 * | 11/2001 | Salas et al. .................. 705/54 |
| 6,317,777 B1 | 11/2001 | Skarbo et al. ............. 709/204 |
| 6,473,102 B1 * | 10/2002 | Rodden et al. ............. 345/788 |

* cited by examiner

*Primary Examiner*—Kieu D. Vu
(74) *Attorney, Agent, or Firm*—Shelley M Beckstrand

(57) ABSTRACT

Browsing in collaboration space is done by presenting to a user an interface to collaboration space. Responsive to the user opening a main window, presenting a selector and results of a search in the main window. Responsive to selection of the selector, a separate quick browse window is opened and objects searched to generate a set of hits which are linked to the main window without losing context. Context is displayed in the quick browse window in a hypertext markup language format, with an entry for each item in the set of hits. Responsive to user selection of an item in the quick browse window, paging controls redirect the main window to a linked page for displaying the quick browse window while the user browses target pages and accesses local settings of the target page to display context of the target page.

10 Claims, 14 Drawing Sheets

SERVER 100

| | |
|---|---|
| POMINO SERVER | 104 |
| HTTP SERVER | 106 |
| MS-IIS SERVER (OPTIONAL) | 150 |
| QUICKPLACE EXTENSIONS | 108 |
| SPELL CHECKER | 152 |
| LIMERICK (TEXT TO GIF) | 154 |
| OFFLINE HANDLER | 156 |
| SAME TIME CHAT | 158 |
| DATABASES AND TEMPLATES | 160 |

CLIENT 102

| | |
|---|---|
| RICH TEXT CONTROL | 162 |
| RICH TEXT APPLET | 164 |
| UPLOAD CONTROL | 166 |
| OFFLINE CONTROL | 168 |
| JAVA SCRIPT | 118 |

QUICKPLACE

FIG. 2

| | | |
|---|---|---|
| 172 | PLACE | DIRECTORY | 202
| 174 | ROOM | DATABASE | 204
| 176 | FOLDER | FOLDER VIEW | 206
| 182 | PAGE | NOTE | 208
| 190 | MEMBER | NOTE | 210
| 178 | FORM | NOTE | 212
| 180 | FIELD | NOTE | 214

| | | |
|---|---|---|
| 196 | PLACE TYPE | DIRECTORY* | 216
| 198 | ROOM TYPE | TEMPLATE | 218
| 200 | SKIN | NOTE | 220
| 184 | PLACEBOT | AGENT | 222

FIG. 3

SKINS

METHOD AND SYSTEM FOR PROVIDING A SEPARATE BROWSER WINDOW WITH INFORMATION FROM THE MAIN WINDOW IN A SIMPLER FORMAT

CROSS REFERENCES TO RELATED APPLICATIONS

The following U.S. patent applications, filed concurrently herewith, are assigned to the same assignee hereof and contain subject matter related to the subject matter of the present application.

U.S. patent application Ser. No. 09/752,120 filed 29 Dec. 2000, entitled "Method and System for Creating a Theme of a Place to be Used as a Template for Other Place";

U.S. patent application Ser. No. 09/752,115 filed 29 Dec. 2000, now U.S. Pat. No. 6,744,447 issued 1 Jun. 2004, entitled "Method and System for Automatically Accessing, Processing, and Managing the Data In a Place";

U.S. patent application Ser. No. 09/752,121 filed 29 Dec. 2000, entitled "Method and System for Importing HTML Forms";

U.S. patent application Ser. No. 09/752,172 filed 29 Dec. 2000, entitled "Method and System for Importing MS Office Forms";

U.S. patent application Ser. No. 09/752,942 filed 29 Dec. 2000, entitled "Method and System for Creating, a Place Type to Be Used as a Template for Other Places";

U.S. patent application Ser. No. 09/752,934 filed 29 Dec. 2000, now U.S. Pat. No. 6,791,582 issued 14 Sep. 2004, entitled "Method and System for Identifying and Displaying Information That Is New or Has Been Updated In a Place";

U.S. patent application Ser. No. 09/752,961 filed 29 Dec. 2000, entitled "Method and System for Providing Task Information in a Place";

U.S. patent application Ser. No. 09/752,745 filed 29 Dec. 2000, entitled "Method and System for Providing Synchronous Communication and Person Awareness In a Place";

U.S. patent application Ser. No. 09/752,935 filed 29 Dec. 2000, entitled "Method and System for Allowing In Place Editing of Office Documents In a Place".

The present application is also an improvement upon the following copending, previously filed applications, assigned to the same assignee:

Ser. No. 09/473,745 filed 28 Dec. 1999, entitled "System and Method for Interconnecting Secure Rooms";

Ser. No. 09/473,630 filed 28 Dec. 1999, entitled "System and Method for Dynamic Management of Web Site";

Ser. No. 09/473,640 filed 28 Dec. 1999, entitled "System and Method for Presentation of Room Navigation";

Ser. No. 09/473,098 filed 28 Dec. 1999, entitled "System and Method for Independent Room Security Management";

Ser. No. 09/477,477 filed 4 Jan. 2000, entitled "System and Method for Dynamically Generating Viewable Graphics";

Ser. No. 09/477,471 filed 4 Jan. 2000, entitled "System and Method for Dynamic Browser Management of Web Site";

Ser. No. 09/477,474 filed 4 Jan. 2000, now U.S. Pat. No. 6,772,393 issued 3 Aug. 2004. entitled "System and Method for Room Decoration and Inheritance";

Ser. No. 09/477,469 filed 4 Jan. 2000, now U.S. Pat. No. 6,594,664 issued 16 Jul. 2003, entitled "System and Method for Online/Of f line Uninterrupted Updating of Rooms in Collaboration Space";

Ser. No. 09/477,473 filed 4 Jan 2000, now U.S. Pat. No. 6,636,889 issued 21 Oct. 2003, entitled "System and Method for Client Replication of Collaboration Space";

Ser. No. 09/477,476 filed 4 Jan. 2000, now U.S. Pat. No. 6,748,425 issued 8 Jun. 2004, entitled "System and Method for Browser Creation and Maintenance of Forms"; and Ser. No. 09/478,238 filed 4 Jan. 2000, now U.S. Pat. No. 6,728,762 issued 27 Apr. 2004, entitled "System and Method for Browser Definition of Workflow Documents".

BACKGROUND OF THE INVENTION

1. Technical Field of the Invention

This invention relates to web technology. More particularly, it relates to the creation and use of collaboration sites on the Internet or on an Intranet client/server system and to the graphical user interface used in Internet communications.

2. Background Art

The Internet and the World Wide Web (WWW) provide intra-enterprise connectivity, inter-enterprise connectivity and application hosting on a larger scale than ever before. By exploiting the broadly available and deployed standards of the Internet and the WWW, system users and designers can leverage a single architecture to build client/server applications for internal use that can reach outside to customers, business partners and suppliers.

Collaboration requires simultaneous communication between individuals on a project team. Typically, this has required that the team members work in the same location. Phone and video conferencing has enabled some remote work on the part of team members. Also, because of the growth of the Internet, collaboration using web technologies has been attempted, primarily using electronic mail (E-mail), Internet chat rooms, electronic whiteboards, and conferencing software. The most useful has been E-mail, but this approach results in a large trail or thread of notes as collaboration on a project advances, and these notes have no home or place to reside which is accessible by all team members substantially instantaneously and simultaneously. People often enter such a thread at different points, and such threads are not efficient in coordinating the work of many different people on a team which may include in-house developers and others, such as remote contractors, outside of an enterprise's firewall.

In order for such disperse teams to have the same, or substantially the same, collaboration environment as individuals working in the same physical office, a system is required which facilitates instant messaging, voice conferencing, electronic white boarding, and text and non-text file exchange. Such a system needs to provide a collaborative electronic room, or space, which is easily configured for use by team members without substantial administrative or application development support, and preferably include both groupware and project oriented applications such as shared folders, file exchange, workflow, group calendars, threaded conversations, version control, file locking, file merging, and security.

There is a need in the art for such a system which is easy to set up and which enables diverse and remote teams to become immediately productive in a secure environment. It would be, further, most desirable to allow such a collaborative environment to be set up without administrative support, that is by members of the team itself, using a familiar and easy to use browser user interface. Members of the team, acting with manager or author authority, and using such a browser interface without involving administrative or application development support, need to be able to set up a folder or room for each project element, such as a source code component, with version control, workflow elements, and group calendaring for tracking the project or project element with respect to approvals and deadlines. Such a room needs to receive from team members reports and have them routed to appropriate team members for review, resolution, and approval.

The WWW is a collection of servers on an IP (Internet Protocol) network, such as the Internet, an Intranet or an Extranet, that utilize the Hypertext Transfer Protocol (HTTP). Hereinafter, "Internet" 100 will be used to refer to any IP network.

HTTP is a known application protocol that provides users with access to files, which can be in different formats, such as text, graphics, images, sound, and video, using a standard page description language known as Hypertext Markup Language (HTML). Among a number of basic document formatting functions, HTML allows software developers to specify graphical pointers on displayed web pages, commonly referred to as "hyperlinks," that point to other web pages resident on remote servers. Hyperlinks commonly are displayed as highlighted text or other graphical image on the web page. Selection of a hyperlink with a pointing device, such as a computer mouse, causes the local computer to download the HTML associated with the web page from a remote server. The browser then renders the HTML into the displayed web page.

Web pages accessed over the Internet, whether by a hyperlink, opening directly via an "open" button in the browser, or some other means, are commonly downloaded into the volatile cache of a local computer system. In a computer system, for example, the volatile cache is a high-speed buffer that temporarily stores web pages from accessed remote web sites. The volatile cache thus enables a user to quickly review web pages that were already downloaded, thereby eliminating the need to repeat the relatively slow process of traversing the Internet to access previously viewed web pages. This is called local caching.

There is a need in the art for a system and method for enhancing browsing in collaboration space of collections of links. These link collections exist in a variety of formats which users need to be able to quickly visit in any order. For example, a random access UI is needed to What's New and Search Results links. These items can reside in more than room, producing potentially brutal context switches from one link to the next. Also, newcomers or casual users of the collaboration space have trouble knowing how to get started and where they can go in a QuickPlace, and would be greatly assisted by the presence of quick-browse windows, such as (1) live "go there" links from the Tutorial (in a window) to specific locations, (2) live "go there" links from Help to specific locations, and (3) a generated Sitemap (a simple rendering of the access-controlled TOC hierarchy). Further, it is desired to support random-access browsing of the links in any folder as a set.

One approach known to the art is to rely on the browser Back button, like regular websites. This meets all three requirements (assuming no actual reload on browser "Back" in the frameless architecture). However, using the Back button this can be a frustrating experience, and QuickPlace is different from average websites in that much heavier use is expected from authors and managers than would be typical of the average web user. Heavier use requires more efficient ways of getting around.

It is an object of the invention to provide a collaboration space application model for creating web applications that are aesthetically pleasing and present the user with a simple interface.

It is a further object of the invention to provide for creating web applications that are instantly created, instantly archived, team and project oriented, easy to use, created, accessed and administered via the Web, reusable, and extensible.

It is an objective of the invention to provide an improved user interface which is quick to load, takes up minimal screen space (at least while the user browses target pages), and which, while browsing a target page from the Quick-Browse setting, allows users to see and access the page's local setting so that they understand the page's context—e.g., its TOC location, folder, parent (responses), and/or ancestors (revisions).

SUMMARY OF THE INVENTION

In accordance with the invention, there is provided a method and system for browsing in collaboration space by presenting to a user at a browser an interface to collaboration space; providing in a main window in the interface a quick browse selector; responsive to user selection of the quick browse selector, creating a set of links to control the main window without losing context, displaying the context in a separate quick browse window in a simpler format; and responsive to user selection of an item in the context, displaying in the main window an object linked to the item.

In accordance with an aspect of the invention, there is provided a computer program product configured to be operable for browsing in collaboration space by presenting to a user at a browser an interface to collaboration space; providing in a main window in the interface a quick browse selector; responsive to user selection of the quick browse selector, creating a set of links to control the main window without losing context, displaying the context in a separate quick browse window in a simpler format; and responsive to user selection of an item in the context, displaying in the main window an object linked to the item.

Other features and advantages of this invention will become apparent from the following detailed description of the presently preferred embodiment of the invention, taken in conjunction with the accompanying drawings.

BRIEF DESCRIPTION OF THE DRAWINGS

FIG. 2 is a schematic representation of various server and client components implementing the collaboration space of the preferred embodiments of the invention.

FIG. 3 is a schematic map illustrating Domino objects relating to the object model of the collaboration space of the preferred embodiments of the invention.

BEST MODE FOR CARRYING OUT THE INVENTION

Architecture Overview

Figure 1:
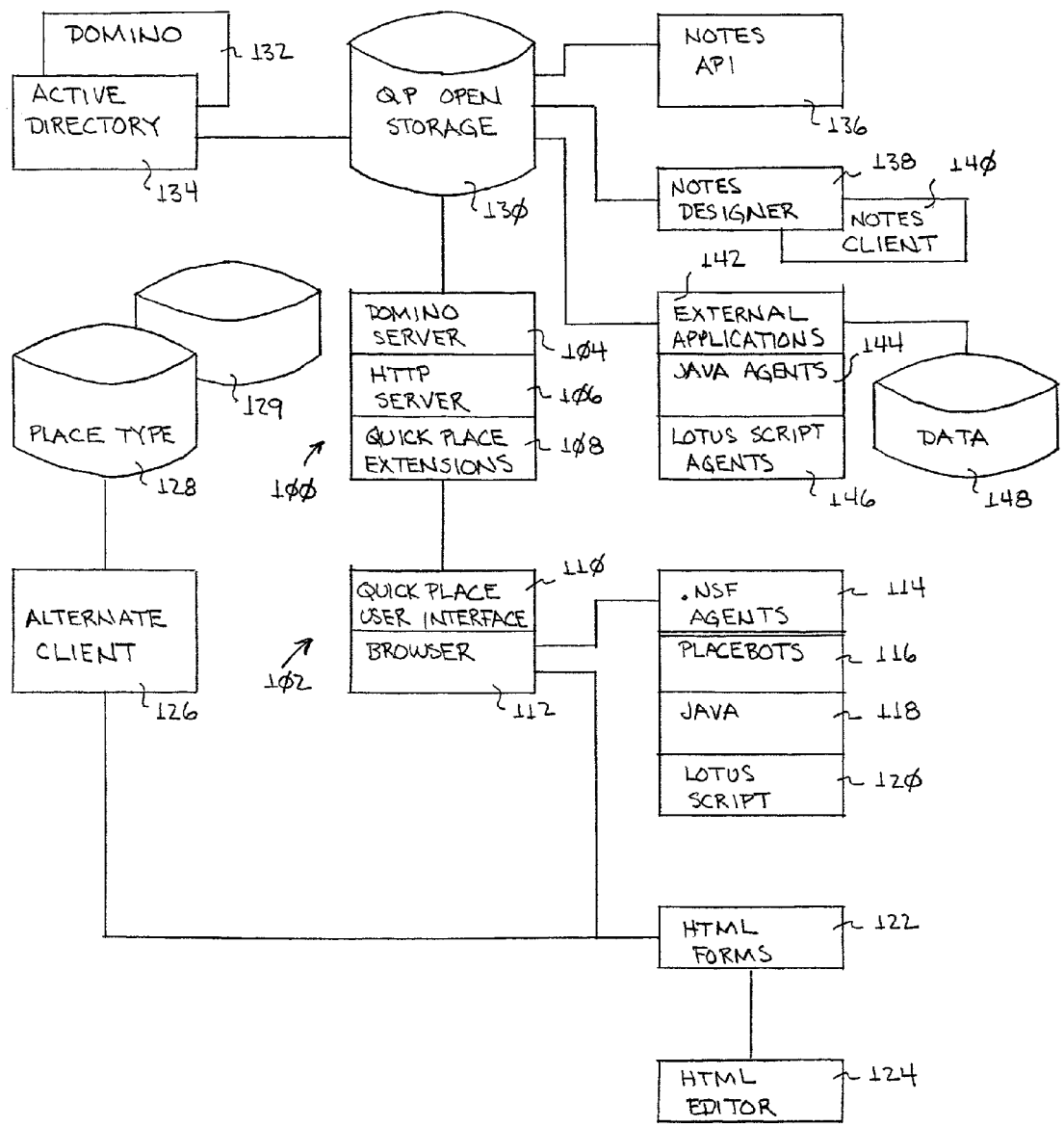
FIG. 1 is a schematic representation of a typical server/client system implementing the collaboration space of the preferred embodiments of the invention.

Referring to FIG. 1, a broad overview of a system implementing the collaboration space technology of an exemplary embodiment of the system of the invention is presented.

Server 100 includes a Domino server 104, HTTP server 106, QuickPlace extensions 108, and open storage 130. Client 102 includes a QuickPlace user interface 110 and browser 112.

QuickPlace open storage 130 includes all the databases and templates that implement the collaboration space. Domino 132 and active directory 134 define the collaboration process. The user interfaces with the system through browser 112. NSF agents 114, 116, Java 118 and LotusScript 120 represent components and templates downloaded from server 100 in support of collaboration space at client 102. All the extensions 108 are keyed off the URL, as will be further explained hereafter.

Notes API 136, Notes designer 138 and client 140, external applications 142, including Java agents 144 and LotusScript 146, are located off of open storage 130. Open storage 130 is storage where a document can be communicated, such that external applications 142 may manipulate it. QuickPlaces, pages, folders, can be created and changed, and data 148 can be imported and exported, using agents in Java 144 or LotusScript 146.

QuickPlace is primarily concerned with representing the callaboration space. Consequently, designers and consultants are able to integrate into that space custom features and data from other applications. HTML forms 122, written using an HTML editor 124, skins 248 (HTML 244 and QP tags), external files written using Java 118, and MS office documents 250 from MS office 228, may be imported to server 100 by dragging and dropping 111 from local storage 502 into an upload control panel 240 in browser 112.

An alternate client 126 and encapsulated place types 128 may be provided from which other spaces 129 can be created that take advantage of the QuickPlace storage model, providing functionality which can be manipulated using browser 112, including the integration of external technology providing opportunity for deep customization.

Server/Client Components

Referring to FIG. 2, in accordance with an exemplary embodiment of the invention, several components comprise QuickPlace server 100 and client 102.

QuickPlace is built on top of the Domino server 104. In the case of a stand alone installation, a subset of the Domino server is installed. Server 100 also includes HTTP server 106, or the optional MS IIS server 150. QuickPlace extension 108 is where we built most of the collaboration space implementing code exists the server 100. Server 100 also includes a spell checker 152 and a text to GIF converter (Limerick).

Client 102 includes rich text edit control 162, and applet 164 with which to apply various attributes and is a key component of the QuickPlace experience. Upload control 166 is used to attach and upload files, such as bringing in an agent and uploading it to a place. This is also used to bring in an imported HTML form or a different skin. Upload control is implemented to allow ease of use via drag and drop. Java script 118 includes code downloaded to the client to complete the generation of HTML pages.

Collaboration Space Object Model Overview

Referring to FIG. 3, the collaboration space of the preferred embodiment of the invention, referred to as Quick-Place, is implemented with an object model which comprises very few objects, very few concepts in order to make it easy to build and manage. And the fewer concepts, the better.

Referring to FIG. 3, the object model is independent of its implementation. There exists a place 172 that has rooms 174, and there are pages 182 in those rooms. And then there are members 190 of the place. Those four objects 172, 174, 182 and 190 are the primary objects.

Folders 176 add more complexity to the model, but bring a lot of benefit as well. Pages 182 are organized within folders. Two further objects are primarily visible to the designer of the place. And these are forms 178 and fields 180.

Place type 196 is a more advanced object, and is an object from which a place 172 is created. Place type 196 represents the foundation for building true collaborative applications. Everything created in building collaboration space is done in a place 172. Once such a place is created, it can be made a template 266 and copied as a place type 196. Once it becomes a place type 196, it is available for use by others for building additional places 172 that include the format, look and feel, and other characteristics of the original place.

Room type 198 is an object provided for creating rooms 174 which are of a given type.

Figure 5:
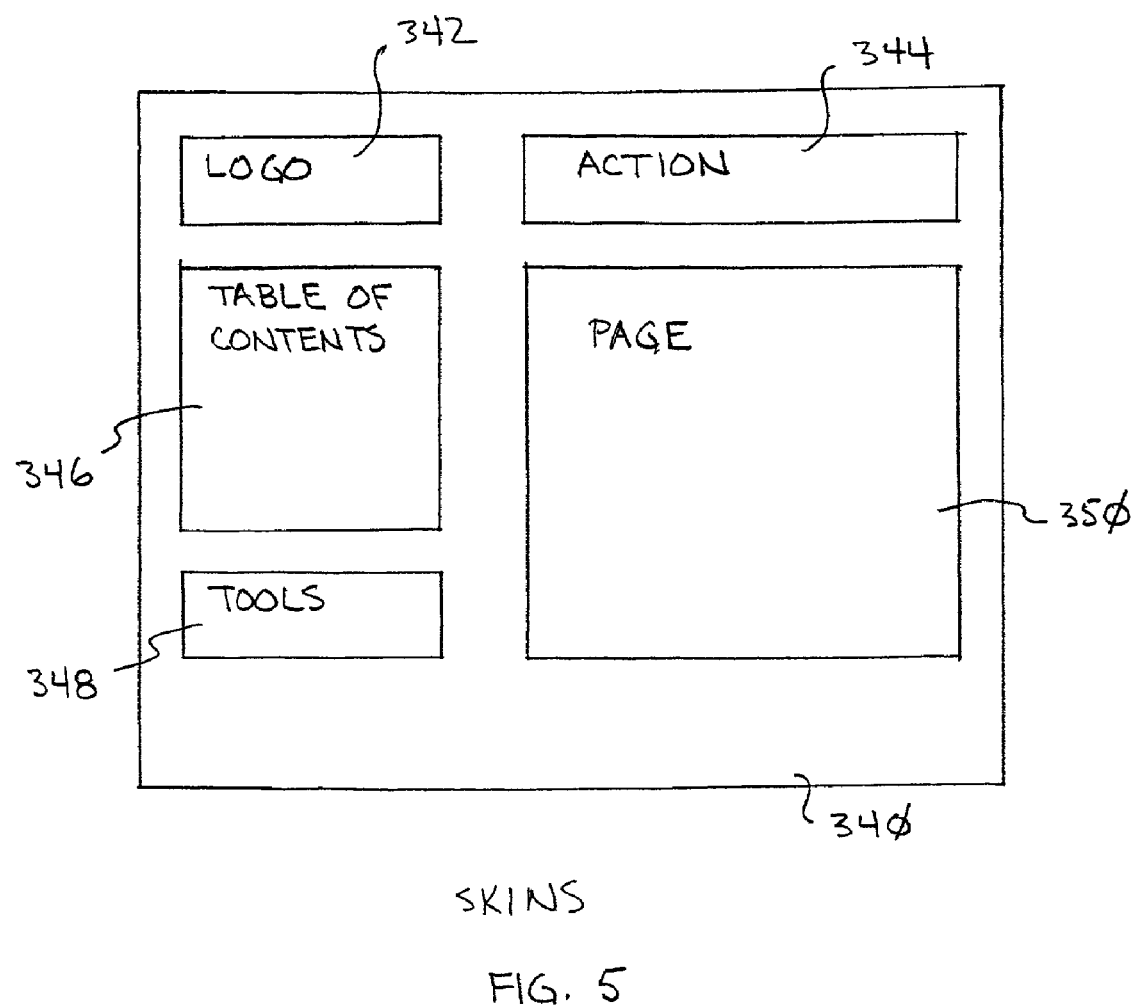
FIG. 5 illustrates the components of a collaboration space user interface.
Figure 6:
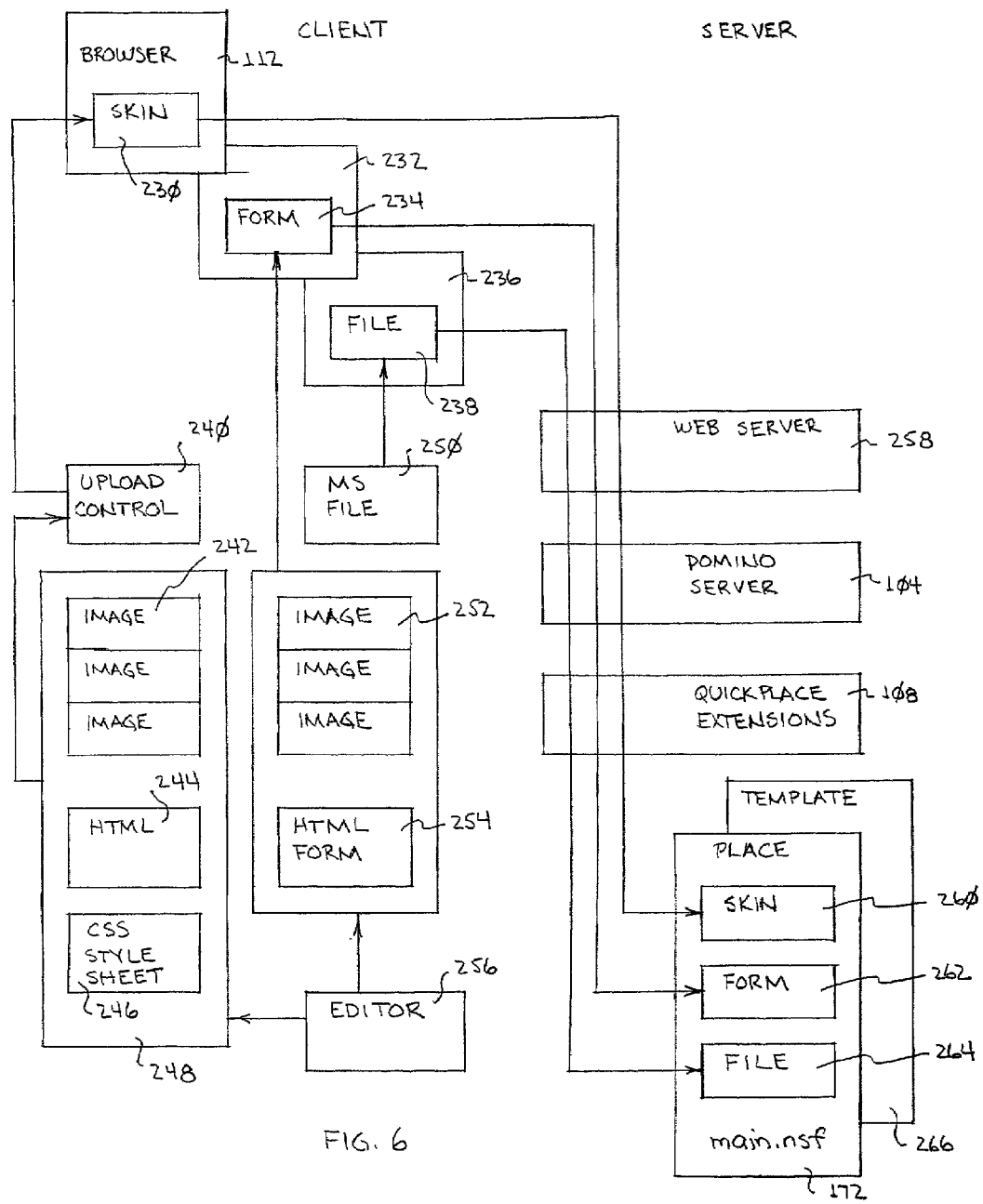
FIG. 6 is a flow chart representation of generation of collaboration space data objects.
Figure 7:
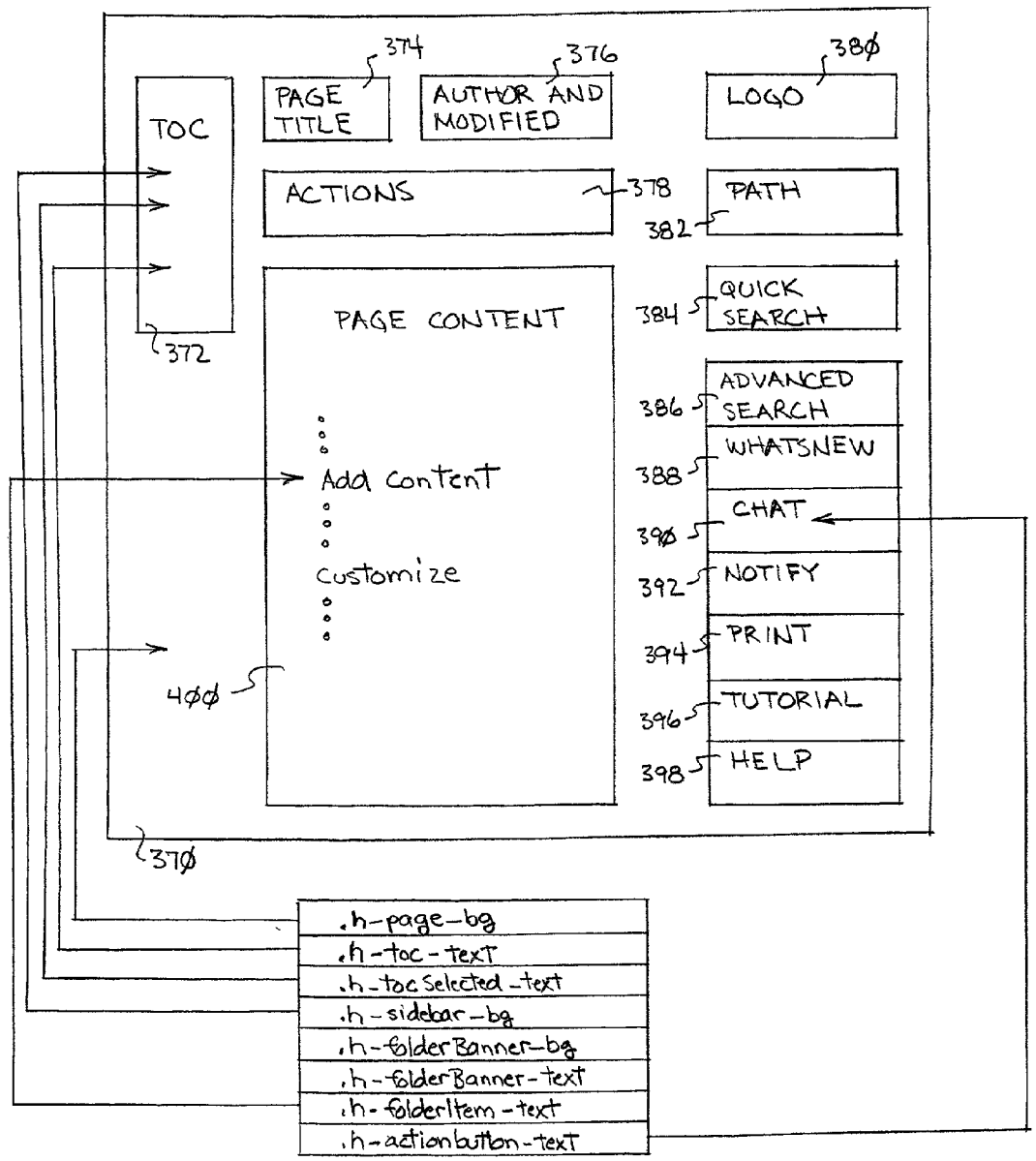
FIG. 7 illustrates a typical collaboration space user interface.

The last two objects illustrated in FIG. 3 are skins 200 and PlaceBots 184. Skins 200 control everything about the user interface, including layout and style. Layout defines the positioning of components on the screen. A skin provides the layout, and look and feel of a QuickPlace. Layout refers to the positioning of components on a page, and which to include. Referring to FIG. 5, the components of a page 340 include logo 342, table of contents (TOC) 346, actions 344, tools 348 and page content 350. Style defines the form and colors of those components. A PlaceBot 184 is an enhanced agent, enhanced in the sense that it enables the use of Java or Lotus Notes or equivalent text editors. Once written using such an editor, and uploaded to a place 172, the server compiles the PlaceBot into an agent, reporting any errors. The agent resulting from a compiled PlaceBot can be scheduled to run at certain times, or upon opening a form. That is, the PlaceBot may be associated with a form, such as a sales order which, when opened, will cause the agent to execute. Thus, PlaceBots 184 are an essential part of building collaboration applications, for they are the primary repository for custom logic.

Referring further to FIG. 3, a preferred implementation of the object model heretofore described uses Lotus Notes/Domino concepts and objects. Thus, Notes/Domino file system directory 202 represents place 172; database 204 represents room 174; folder view 206 represents folder 176; pages 182, members 190, forms 178, fields 180 and skins 200 are represented by notes 208, 210, 212, 214, 220, respectively.

Place 172 is represented as a file system directory. So whenever a place called Acme is created, a file system directory 202 called Acme will be instantiated. Within that directory 202, there are a number of objects. Each room 174 is a Notes database 204. Folders 176 are implemented as Notes folders or views 206 depending on what's more convenient for the particular folder.

Pages 182 are a combination of data notes, forms and sub-forms 208. A member 190 is a data note 190 in a context room 174. Forms 178 and fields 180 are data notes. Place type 196 is a directory* 216 that contains all the rooms 174 that make up that place type. A room type 198 is a template 218. Skins 200 are a note 220 and PlaceBot 184 is an agent 222.

Notes/Domino Implementation of the Object Model

Developers familiar with the Domino Object Model (Domino OM) will be able to leverage their existing skills when developing on the QuickPlace platform. "PlaceBots" for example are actually implement Domino Agents, and it is possible to create and test them on Domino Databases. Within the QuickPlace object model (OM), however, there are some divergences from the Domino OM. For example, QuickPlace forms 178 are not the same as Domino Forms. QuickPlace forms more closely resemble Domino Documents, because they are created using a Domino form, and contain a Domino text field with a value of "h_Form". The value of "h_form" tells QuickPlace that this Domino document should be rendered in a browser as a QuickPlace form 178.

This structure provides flexibility for Web applications with less complexity than if Domino Forms were used. For example, in a default QuickPlace, a user can create a new QuickPlace form 178. The user chooses which fields to include in form 178, in what order they should appear and what text and or graphics should appear near them. To create this sort of instant structure on the Web using Domino Forms would be very complex indeed. QuickPlace has extended this concept of being able to use HTML to define forms 178 by enabling the creation of custom QuickPlace forms using imported HTML 122. These Forms not only make use of Web authoring technologies such as JavaScript, but also have the back end support of Domino. This back end logic is implemented via tools such as PlaceBots (Domino Agents) 184. This means that forms 178 have the ability to not only to define the look and feel of visible parts of an application, they also have the potential to initiate workflow and many other powerful automated features.

QuickPlace forms 178 have been optimized by stripping away many of the Notes features not required when used on the Web. A another advantage of this structure is that it enables the use of Web authoring tools to extend the objects. For example, with respect to QuickPlace forms, it is possible to modify forms using XML, JavaScript and HTML and any other Web tools. Knowledge of JavaScript and HTML are more common than Domino Designer skills, thus making the QuickPlace a very open platform. Some parts of the QuickPlace OM implement Domino/Notes functionality in different ways to a standard Domino application. For example, QuickPlace uses Domino's security and authentication model as a basis for its management of access to QuickPlaces. However, instead of primarily utilizing the Domino Directory, QuickPlace also uses a Contacts1.nsf database for each QuickPlace.

Containment and Association of Objects

Figure 4:
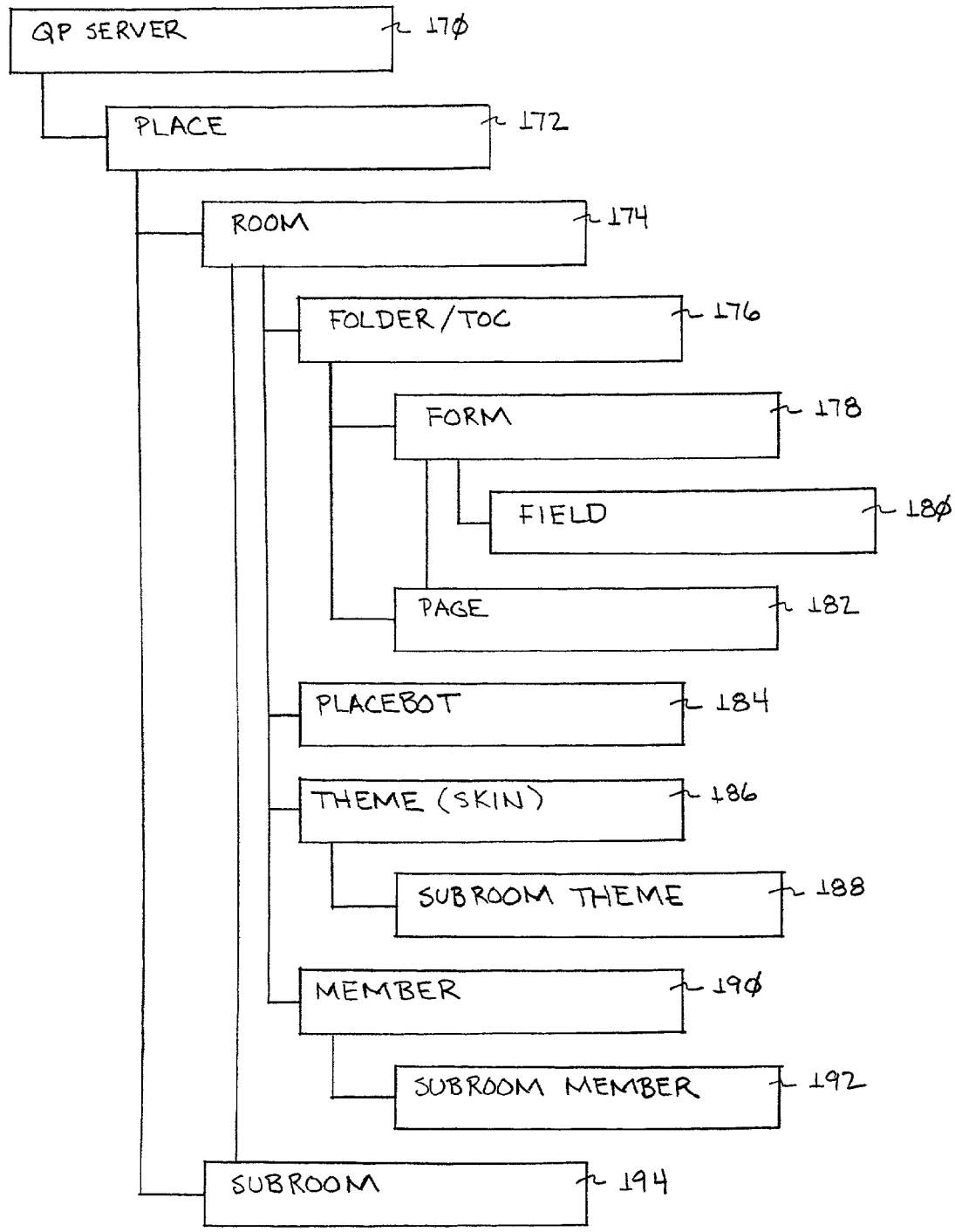
FIG. 4 is a schematic map of the object model implementing the collaboration space of the preferred embodiments of the invention.

Referring to FIG. 4, this object model is further described. FIG. 4 illustrates selected QuickPlace objects, the directory structure and how Objects relate to each other within the hierarchy. This model provides a visual representation of the containment and association between objects.

QuickPlace Server

The highest level of the model is the QuickPlace Server 170. Within server 170 are all of the QuickPlaces 172 as well as the resources they access to finally render Web applications.

This FIG. 4 displays the Model focusing on QuickPlaces. The following explanation, written from a programmers perspective, describes each of the objects of the model and they can be accessed in an application.

QuickPlace uses notes for many of its objects 182, 190, 178, 180 and 200, so that objects in the Place can be organized more easily. Table 1 sets forth the QP objects and their Notes/Domino equivalents. As an example of how design Notes are implemented consider the Table Of Contents (TOC). The Table Of Contents is a list of pages, folders and tools such as the Customize Area. Domino Folders may be listed using a link document, or Note.

TABLE 1

QUICKPLACE OBJECTS AND DOMINO EQUIVALENT

| QuickPlace Object | Domino Equivalent |
|---|---|
| QuickPlace Server | File Directory |
| Place | File Directory |
| Page | Data Note, Form & Subform |
| PlaceBot | Domino Agent |
| Theme | Data Note |
| Member | Data Note in Contacts1.nsf |
| Subroom * | NSF Database |
| SubroomTheme | Data Note |
| SubroomMember | Data Note in Contacts1.nsf |
| Room | NSF Database |
| Folder/TOC | Folder or View |
| Form | Data Note |
| Field | Data Note |

* Subrooms contain their own set of Folder, Page, Form, Field, PlaceBot & Subroom Objects QuickPlace Server 170 is a file directory containing all Places and Resources. The Domino equivalent is a file directory 202 named "quickplace". This identifies the main folder 176 for a QuickPlace server 170. If the QPServer 170 is running as a stand alone, this folder will be in the QuickPlace data folder. For example D:\QuickPlace\Data\quickplace.

If the QPServer 170 is running on top of a Domino server the folder will be the Domino Data folder. For example D:\Lotus\Domino\Data\quickplace.

To locate QuickPlace Server 170 in PlaceBots and get access to all of its databases, a LotusScript method GetDbServer is executed together with a test that the Path to databases starts with "QuickPlace".

Place Object

Place object 172 is a directory in the "QuickPlace" directory grouping resources for a Place. The Domino equivalent is a file directory bearing the name of the Quick-Place. Place object 172 is a directory that brings together a Place for organizational purposes. It also identifies the NSFs 114 as belonging to the place 172 by bearing the name of the QuickPlace. As distinguished from a place object 172, the main room 174 in a QuickPlace is a database called Main.nsf. Place object 172 groups and identifies the Main.nsf resources for the Place and any subrooms 194 in the Place. Place object 172 contains several files. There is a Main.nsf, Contacts1.nsf and a Search.nsf file. If the QuickPlace has a Subroom 194 there will also be an NSF file with its name starting with "PageLibrary". Each of these page library files is a Room 174.

The place object in PlaceBots 184: place object (directory) 172, contains the databases which form a place. When writing PlaceBots, one can search for this directory by using the name of the QuickPlace. In this directory will be found all the databases will belong to that place 172. This file directory's name is the name of the QuickPlace. For example, if the QuickPlace is called "Millennia", this directory has the following path within the QuickPlace server 170:

\millennia

To find the place object 172 for the Millennia Place in LotusScript the script procedure of Table 2 may be used:

TABLE 2

SCRIPT PROCEDURE FOR FINDING A PLACE

Dim ndbPlace As NotesDatabase
Set dirPlace = New NotesDbDirectory ( g_sServerName )
Set ndbPlace = dirPlace.GetFirstDatabase ( DATABASE )
sNdbPlaceFilepath = ndbPlace.FilePath
If Instr(1, Lcase( sNdbPlaceFilepath ),
|quickplace\millennia| ) Then
' //the Place is found

Room Object

Room object 174 is the main container for a Place, containing a collection of pages and tools. The Domino Equivalent an NSF Database. The room 174 is the main container for a QuickPlace's content. For example, when using the Millennia Place, most of what is seen is contained in the Room object. The Room object is always called Main.nsf, and holds folders 176 and pages 182 for the QuickPlace, as well as managing links to any subrooms 194 in the place object 172. Room object 174 uses elements held in other databases. For example many of the standard images QuickPlace displays are in a resources object (not shown). Each room 174 has its own security and authentication, and the information required to do this is contained in databases such as Contacts1.nsf. A room 174 breaks down a place 172 into smaller areas to help define structure. Each room 174 has its own security and authentication. This allows separate user groups. It also means that subrooms 194 can be created for separate projects, forming a separate shared space. The room object 174 then forms a common entry point where shared resources can be stored.

The room object in PlaceBots: to locate a room 174, one looks in the main QuickPlace Server 170 directory, then looks into the room object (a directory bearing the name of the QuickPlace), then looks for a database called "Main.nsf".

Returning to previous LotusScript example of locating a Place 172 (Table 2), the match string can be extended from "quickplace\millennia" to "quickplace\millennia\main.nsf"

To find the room object 174, as set forth in Table 3.

TABLE 3

SCRIPT PROCEDURE TO FIND A ROOM OBJECT

Set dirPlace = New NotesDbDirectory ( g_sServerName )
Set ndbPlace = dirPlace.GetFirstDatabase ( DATABASE )
sNdbPlaceFilepath = ndbPlace.FilePath
If Instr (1, Lcase ( sNdbPlaceFilepath ),
|quickplace\millennia\main.nsf| ) Then
' //the Room id found.

To access elements contained in a room 174, the views and folders 176 in the room are accessed. For example to find the elements visible in the Table Of Contents (TOC), the "h_TOC" view is used.

The Room object 174 in HTML is visible in URLs as the "main.nsf". To access room object 174 most easily, a relative path is used from the current object if it is in the same Place 172. For example, when creating a URL link from a subroom 194 to a room 174, the URL begins as follows:

<a href="../../Main.nsf/

Where the "dot dot slash dot dot slash" syntax is a part of the URL, not an abbreviation for this example. Using this relative URL makes the URL more robust. In other words, this URL can be used to find the (Main.nsf) room 174 for any place 172.

Room fields 180 used to define rooms 174 are set forth in Table 4.

TABLE 4

FIELDS DEFINING ROOMS

| Field Name | Description |
|---|---|
| h_HaikuName | The name of this Place |
| h_AreaType | The name of the template used to create this room. |
| h_AreaParent | The name of the parent database |
| h_ShowSecurity | If h_SetSecurity = 1, the QuickPlace server sets h_ShowSecurity to 1. |
| h_SetCalendar | Determines if the Calendar will be visible in a Room. If the field has the value of "1" a link to the Calendar will be displayed in the sidebar |
| h_SetSecurity | This field works in conjunction with the h_ShowSecurity field. It is only valid for Readers and Authors, because Managers must always be able to edit security of a Room. If the field is set to "1" a link to the Security page will be displayed in the sidebar for Readers and Authors (if they select Security in this case they will see only their own information) |
| h_MailDb | The name of the database that receives email addressed to this Place. |

Folder Object

A folder object 176 is an object for indexing content, grouping related pages 182, and dividing a room 174 into sections without imposing new security. The Domino equivalent is Notes folder or view 206, and Notes folders 206 have three functions. For the user, they provide a logical grouping of related documents. This makes it easier for the user to find documents, and allows people with a shared interest to work an area of a QuickPlace. The other way of using folders is in the user interface, or "User" folders. Within user folders there are seven different types:

1. Standard List
2. Headline
3. Slide Show
4. Response List
5. Ordered List
6. Table Of Contents
7. Index Folder types 1 to 5 are all available as styles for new, custom folders. From the a site manager's perspective, a Folder allows a QuickPlace to be divided into areas for separate groups of people, without having to be concerned about access control which would be necessary if a Subroom 194 were used.

Fields include the following:

"h_LastAttachmentDirectory": used when getting attachments. This field enables users to quickly upload attachments. For example, each time a Layout file is uploaded, QuickPlace knows where to go looking for the file. This path information is sourced from this field.

"h_DirtyAesthetics Number": indicates which items should be checked (once a part of the aesthetics has been tweaked, a check mark indicates that the part has been changed).

h_AreaHasAesthetics: indicates if a Room has its own aesthetic settings enabled. If the field value is "1" the Room has had the aesthetics tweaked.

The third way that folders 176 are used is to allow developers to locate elements in a QuickPlace. To a developer, folders are indexes that allow look ups, therefore giving programmatic access to elements.

When any page renders in a Browser, the time it takes to render is directly dependant on the amount of information to be downloaded. The amount of information required to render a Folder is less than for a Page. When Pages appear in Edit mode, there is yet more information required to render it. Therefore, the quickest load time for a QuickPlace by first using a folder 176 as the first page the user sees when upon selecting a place. Once users have visited a folder 176, a subset of the resources used to render a page 182 will already have been downloaded. The folders used by developers are slightly different to than the folders users would use. The h_Index lists the published pages in the Place and appears as the standard index of a Place, and the h_TOC is the table of contents list.

Some of the folders in look ups by developers are set forth in Table 5.

TABLE 5

VIEWS USED TO REFERENCE OBJECTS

| View Name | Description |
|---|---|
| h_Index | Provides a list of all published Pages in a Room, listed by h_UNID, the unique identifier for a Page. Lists all published items in a Room, this not only includes Pages but all of the Objects in a Place. For example, Pages, PlaceBots, Fields, Skins and Forms. |
| h_QDK | Every Design Note in a Place. The h_QDK view contains a form formula to open different documents using different forms. For example: If the field "h_Type" is "0" then use the form named "h_Page". The result of this form formula is that the QDK view allows developers to inspect the properties of some Design Notes. The supported types are: "h_Page", "h_Folder", "h_Room", "h_SubRoom", "h_Error"and "h_RoomType". |
| h_TOC | List of all items displayed in the Table Of Contents. Items must have the "h_IsInTOC" field with a value of "1" and be published with no replication-save conflict. |
| (All) | Every item in the Room. Sorted by the h_Name field: the readable name of the item. For example "Welcome", representing the default Welcome page. |

The Place Object in PlaceBots: Internally, default QuickPlace Folders have readable titles. For example the response folder discussion" has the internal name of "h_Discussion" in the "h_SysName" field. A new response list style folder is called "SchwatzRaum" ("chat room" in German). The internal name of the SchwatzRaum Folder is: "h_F49791727035ACD1C12569510063087C" (which means ("h_F49791727035ACD1C12569510063087C" in German). This unique identifier can be used in PlaceBots to locate the Folder. A lookup can be done in the "h_Folders" view of a QuickPlace to find the readable name of the folder. Another solution is to retrieve the name of the field by accessing the value in the h_SysName field. The Table of contents and the Index are special user Folders 176. Only one TOC and one h_Index exists per Room 174 or Subroom 194. They exist from the moment the Place or Room is instantiate, and change them.

Folder Fields

The following Fields are used to define data notes that render as Folders. Folders exist in a visible form within a QuickPlace. In other words they can be viewed by opening the NSF file in the Notes Client or Domino Designer. In conjunction with this view, a data note exists, providing information about that Domino View or Folder. Table 6 lists the fields are contained in the data note and provide information about the Domino View or Folder.

TABLE 6

FIELDS USED TO DEFINE FOLDERS

| Field Name | Description |
|---|---|
| h_FolderStyle | When creating a new folder, one is given the choice to create a new folder based on a number of templates. This field denotes which type of folder has been created.<br>"1" = Standard List<br>"3" = Headline<br>"4" = Slide Show<br>"5" = Response List<br>"7" = Ordered List |

TABLE 6-continued

FIELDS USED TO DEFINE FOLDERS

| Field Name | Description |
| --- | --- |
| h_FolderStorage | The "internal" name of the folder, in other words, the name by which it is known to the system. The value of this field is used in documents to tell QuickPlace in which folder it should be used. |
| h_CanAddPages | When creating a new folder, the manger is presented with the options, to the question "Who can add pages to this folder?". If only managers is chosen the value of "0" is written to this field. The default is " " which means all authors can add pages to this folder. |

Form Object

A form object 178 is a document used to create new QuickPlace content. The Domino equivalent is a data note of type "h_Form". Form object 178 is a resource used to create, manage and display content, therefore defining the schema of the application. Forms contain fields to hold data, therefore creating and displaying content. Forms can also contain scripts within them to provide logic within the Page. For example, a form can contain form validation to make sure that a field contains only numbers. Forms can also initiate processes outside the page. This is done by creating a PlaceBot 184 and associating the PlaceBot with a Form 178. PlaceBots 184 are not contained by the Form but there is a association between them.

Forms are created with the Domino Form "h_PageUI" with the field h_Type set to "h_Form". New forms 178 with custom structure and logic can be created by room managers.

Form Fields

Table 7 sets forth the fields 180 used to define the structure of a form 178.

TABLE 7

FIELDS USED TO DEFINE FORMS

| Field Name | Description |
| --- | --- |
| h_FormDescription | The content of this field appears as the description of the form appearing in the "New" page. |
| h_WorkflowType h_ApprovalCycle | Allows 1–4 approvers and some other options. This is normally set to "h_Standard". |
| h_EditorInChief | Allows 1 approver and fewer options. |
| h_MultipleEditors | By setting this field, all members of QP to edit pages created with this form. |
| h_Standard | None of the above. |
| h_SetPageComponent | sView Should be = h_FieldDefinitions |

Field Object

Field object 180 is used to construct (HTML formatted) input fields in forms 178. The Domino equivalent is a Data note of type "h_Field". Fields are constructed from the Domino Form "h_PageUI" with a the field h_Type set to "h_Field".

QuickPlace field object 180 defines the structure of the container, not the content. The values contained in a page 182 are contained by the page, not the fields 180. The h_FieldType attribute to a field 180 determines what sort of field it is. This determines what the field will do when it is rendered in a browser. For example, a field 180 of type h_DateControl will provide the user with a date picker widget.

Domino fields are used to define the attributes of QuickPlace fields 180 are set forth in Table 8. QuickPlace fields 180 are drawn to the screen as HTML, they are not created by a Domino Field in a Domino Form

TABLE 8

FIELDS USED TO DEFINE FIELDS

| Field Name | Description |
| --- | --- |
| h_IsUser | Defined h_True means this is a custom form |
| h_PublishInFolder | UNID of the folder +"|" + |
| h_FolderStorage | name of the folder |
| h_Name | "Import" and is related to the h_SystemName field which often has a similar value such as "h_Import". |
| h_FieldLabel | Instructional information that might be useful for someone editing this field. Similar to the Static h_FieldType. Containing information to help the user, but only displayed in edit mode." For example: <script> (h_CurrentSkin-Type == 'h_Edit' )?"": C(self, 'Note: Clicking on the title of this page in its folder or in the sidebar will open the page that it points to. To edit the page again later, click its title in the Index.');</script>" |
| h_ContainerUNID | The UNID of the Form which contains this field. QuickPlace uses a Design Note to create forms, each of these having an internal name. The h_ContainerUNID contains the internal name of one of these QuickPlace Forms. |
| h_FieldType | There are many different types of Fields. The following types are listed as examples to help understand how Fields work in general. |
| "h_Attachments"= | Enables the attaching of files. |
| "h_CalendarControl"= | Includes date and time controls and a duration field |
| "h_DateControl"= | Date field with date picker widget |
| "h_DateTime"= | Contains Date and Time information. |
| "h_DocAuthor"= | Contains a Domino Heirachical name of the original Author of the Document. |
| "h_DocCreated"= | Creation date of the page. |
| "h_DocModified"= | Modified date of the page. |
| "h_DocSize"= | Size of the page. |
| "h_NamePopup"= | Select listing members of the QuickPlace |
| "h_RichText"= | Rich text field. Allowing editing via the rich text editor applet. |
| "h_Serial"= | A unique number to identify the document. |
| "h_Static"= | Static text, used to provide information about the accompanying field. May also include link to an image. |
| "h_Subject"= | The Documents subject. |
| "h_TaskControl"= | Used in the Task form to insert the task control tool. |
| "h_TextInput"= | Simple text equating to the "<input>" field in HTML. |
| "h_TextPopup"= | Text select list, equating to the "<select><option>" in HTML. |
| "h_TimeControl"= | Select lists for hours, minutes, AM/PM. |
| "h_CalendarControl"= | Field containing control tool used in the calendar field. |

TABLE 8-continued

FIELDS USED TO DEFINE FIELDS

| Field Name | Description |
|---|---|
| "h_CreateMSExcel"= | Field enabling the upload of Excel documents. |
| "h_CreateMSPowerPoint"= | Field enabling the upload of PowerPoint documents. |
| "h_CreateMSWord"= | Field enabling the upload of Word documents. |
| "h_Import"= | Field enabling the upload of imported documents such as HTML. |
| "h_MultipleImport"= | Field enabling the upload of multiple documents, such as a series of HTML documents. |
| "h_NotifyIndicator"= | Field indicating if members should be notified of the creation of content or their inclusion in the Contacts1.nsf. |

Page Object

Page object 182 is a basic building block for content. The Domino equivalent is a data note, form and subform. Pages form the basic units of content, relying on the structure of QuickPlace to create, manage and render them in a Web browser. It differentiates structure and content cleanly. Notes structural elements such as Forms Views and so on provide structure, whereas Notes Documents provide pure data content. In the Domino environment the division between structure and content becomes blurred. This is because when the data in a document is being represented in a Web browser, it is possible to use the data to format itself using HTML. The data is able to start defining structure by creating HTML links, tables, references to images and so on. In the QuickPlace OM, the same is true. Pages can be created in a number of ways. Table 9 sets forth the fields used for defining page objects.

TABLE 9

FIELDS DEFINING PAGE OBJECTS

| h_NotInSearch | Having the value of "1" will exclude the field from being included in a full text search. This allows functional content in fields such as JavaScript or static text to evade returning a hit during searching. |
|---|---|
| h_Position | Indicates the fields position of appearance in a form. Typically numbers such as 100 are used. |
| h_FieldFormat | "h_FieldFormat" indicates formatting options, "h_All" "h_BannerOptional" "h_BannerRequired" |
| h_BannerRequired | Always display subject as a banner at top of page |
| h_BannerOptional | Allow user to choose banner or not |
| h_NoBanner | Do not display the subject on the page |
| h_FieldIsRequired | 1 = The field is required and the user will be prompted if they do not fill it out. |

Page Fields

Page Object in LotusScript and JavaScript: developers wanting to customize pages 182 will generally want to manipulate the page's field 180 values. Fields existing in a Page are generally rendered to the HTML document in the background as JavaScript variables. They are then visibly rendered via document.write() functions. If a field exists, it can be accessed in the browser via a variable with the same name as the field.

The PageBody Field holds the main content or "body" of the page.

Table 10 sets forth the fields 180 used to define page 182 documents in QuickPlaces.

TABLE 10

FIELDS USED TO DEFINE QUICKPlACE PAGES

| Field Name | Description |
|---|---|
| h_Form | The QuickPlace form used to create this page. This is not the Domino "Form" field which denotes which form Domino links the file to. The Domino "Form" field will contain "h_PageUI" for virtually all objects in a QuickPlace. |
| h_PageType | This field is set to null when the document is a visible document. Only when the object is in design mode do the other values appear: "h_Response" the document is a response to a topic document. This value is only valid in response folders. "h_Revision" this means that the document is being revised, and is not available for public access. "h_Mail" means that the document is a mail document, being either sent or received by QuickPlace. |
| h_Originator | The creator of this page. This field contains a full hierarchical name, for example: "CN=David Wyss/OU= QuickPlaceName/OU= QP/O= ServerName". All users have the second OU part of the name set to QP. This is done so that when QuickPlace is used on an Overlay server (QuickPlace and Domino together) QuickPlace can avoid conflicts between Domino registered users and QuickPlace users. |
| h_NameIsBanner | Denotes if the page's name should be displayed as a banner. If it is to be displayed as a banner, this field contains the value "1". Setting this field is done when the user clicks on the "Show the title, author and date on page?" checkbox. |

The JavaScript "document.write" method is used when using the PageBody to write out HTML content in a QuickPlace page. This field can be printed onto the screen via a document.write(PageBody) method called in a QuickPlace document. The following is an example of using this technique.

In a Placebot, write the contents of the document into the PageBody field. If the PlaceBot has not run, or not run correctly, the PageBody field will be empty. If the document is displayed in a form where the PageBody JavaScript variable is not declared, an error will be reported. To avoid an error through an undefined variable, use the "typeof" operator. This test assigns a message string to the sPageBodyMessage variable and prints that instead of the PageBody. To customize this message, the text in quoted on the PageBodyMessage line is changed. Then the following is included in the HTML document:

```
<script language=JavaScript>
if ( typeof( PageBody ) == "undefined" ) {
    var sPageBodyMessage = 'Run the Mapperizer PlaceBot
                to see a site map here. . . ' ;
    document.write( sPageBodyMessage )
} else{
    document.write( PageBody )
}
</script>
```

Page Object in HTML: some of the most commonly referenced JavaScript variables in Pages are set forth in Table 11.

TABLE 11

COMMONLY USED JAVASCRIPT VARIABLES IN PAGES

| Field Name | Data Type, Description |
|---|---|
| h_Name | String, readable name of the Page |
| PageBody | String, content of the page. |
| h_SystemName | String, the internal name of a page. For example, 'h_Welcome' |
| h_Originator | String, full Notes format name of the document creator For example: 'CN=Anna Rath/OU=Millennia/OU=QP/O=Server'; |
| h_IsPublished | String, number representing "1" for published or "0" for not published. |
| h_LastTimePutAway | String, representing the date and time the Page was last saved '09/03/2000 07:54:08 PM' |
| Form | String, Domino Form name used to create the Page. Most documents in a QuickPlace are created with the 'h_PageUI' Form. The value that differentiates fields is the h_Type field. |
| HTTP_COOKIE | String, all cookies available to that Page. |
| HTTP_HOST | String, name of the server. For example 'millennia.com' |
| HTTP_REFERER | Page used to send the user to this page. |
| HTTP_USER_AGENT | String, browser used to access the current Page. For example: 'Mozilla/4.0 (compatible; MSIE 5.0; Windows NT; DigExt)' |
| REMOTE_USER | String, full name of the person reading the Page, for example: 'CN=Doug Mudge/OU=Millennia/OU=QP/O=Server' |
| Server_Name | String, the server name, for example: 'dwyss.lotus.com' |
| h_DocSize | Integer, size of the page, for example: 4705 |
| h_ModifiedDate | String, date and time the page was last saved, for example: '09/03/2000 07:54:05 PM'; |

Using Notes name format in pages can be done with the following JavaScript Function:

```
function fnGetSimpleName (sTxt) {
    iTxtStart = sTxt.indexOf ('=');
    iTxtStart++;
    iTxtEnd = sTxt.indexOf ('/');
    if(iTxtEnd == -1) iTxtEnd = sTxt.length;
    sTxt = sTxt.substr(iTxtStart,iTxtEnd - iTxtstart);
    return sTxt;
};
return fnGetSimpleName ('CN=Doug Mudge/OU= Millennia/OU=
QP/O=Server')
```

This JavaScript will return the string "Doug Mudge"

PlaceBot Object

A PlaceBot object 184 is a Java or LotusScript Domino Agent, used to create or manipulate QuickPlace objects automatically. Domino Equivalent: Domino Agent.

For Java and LotusScript programmers, the PlaceBot is the main way of implementing sophisticated functionality to a QuickPlace. Within the bounds of an HTML document, industry standard authoring tools such as HTML are used. To make links between Objects and manipulate QuickPlace Objects, PlaceBots are used.

Theme Object

A theme object 186 is a group of files which defines the look and feel of a QuickPlace. The Domino equivalent is a group of data notes.

Themes are a mechanism for determining the layout and appearance of a QuickPlace. They also help introduce functionality, and although not their primary function, some content. There are two types of themes 186 in QuickPlace. User defined or custom themes" and default Themes.

Subroom Theme Object

The subroom theme object 188 is a subset of themes 186 in a QuickPlace. The Domino equivalent is a data note. By default, subrooms 194 inherit the theme 186 being used by the (main) room 174. Only when the theme being used in the subroom 194 has been modified, does it act independently of the room 174.

Member Object

A member object 190 is a data note listing a user in the Contacts1.nsf. The Domino equivalent is a note in contacts1.nsf. Members 190 are records specifying user-access to a room 174. A member note contains information about a team member of a QuickPlace. In addition to this data, the member must be listed in the access control list (ACL) of main.nsf and in a group in names.nsf to pass authentication.

Table 12 sets forth the fields 180 used to define members 190.

TABLE 12

FIELDS USED TO DEFINE MEMBERS

| Field Name | Description |
|---|---|
| h_Password | This member's password. Encrypted with @Password |
| h_FirstName | This member's first name |
| h_LastName | This member's last name |
| h_PhoneNumber | This member's phone number |
| h_EmailAddress | This member's email address |

Table 13 sets forth the fields 180 used to define Groups.

TABLE 13

FIELDS USED TO DEFINE GROUPS

| Field Name | Description |
|---|---|
| h_Members | The list of members who belong to this group, listed in full heirachical format. |

Subroom Member Object

A subroom member object 192 is a subset of entries in the main room 174 of a QuickPlace. The Domino equivalent is a Data note in contacts1.nsf. Subroom member 192 has a similar structure to a room member 174, but specifies user-access to the SubRoom. These SubRoom members 192 are a subset of the (main) room 174 members list. This means that to grant access to new users, they must first be added as readers (or greater) in the main room 174.

SubRoom Object

A subroom object 194 is a container within a QuickPlace with separate security to main Room. The Domino equivalent is an NSF Database. Subrooms 194 are similar in structure to Rooms and are used to create discreet meeting places for subset of the Members in a Place.

The subroom object in PlaceBots: To locate a room, look in the main QuickPlace Server directory, then look into the Place Object (a directory bearing the name of the QuickPlace). The Subroom will be named "PageLibrary" followed by a 16 digit hexadecimal time stamp number, such as "0123456789ABCDEF" then the ".nsf" suffix. By way of example, the following script looks for a Subroom to the Millennia place:

```
Set dirPlace = New NotesDbDirectory( g_sServerName )
Set ndbPlace = dirPlace.GetFirstDatabase( DATABASE )
sNdbPlaceFilepath = ndbPlace.FilePath
If Instr(1, Lcase( sNdbPlaceFilepath ),
     |QuickPlace\millennia\pagelibrary| )
Then
```

The Instr method has been used to look for this database, down to the PageLibrary part of the string, because it is difficult to know what the 16 digit number will be. Page Object in HTML: To create URLs to reference Subrooms, the URL is built in the Main Room using either the "h_Area" view or the "h_TOC" view to create the path. This View contains the "h_LocDbName" field as the first sorted column.

Resources Object

A resources object(not shown) is database of shared resources, having as its Domino equivalent NSF Database. It serves as a centralized container for resources required in all QuickPlaces on a server. Images, layout files and fonts are stored in this database. For example resources such as the button that appears beside the simple search image "Go.gif" is stored in this database. The easiest way to find items in this database is by scrolling through the h_System-NameView. A dummy form may be used to view such elements.

Common QuickPlace Object Fields

In Tables 14 through 18, fields and JavaScript variables in the h_PageUI form are set forth. These include general fields which can be customized for each layout, fields to define publishing status, fields for defining locations, fields for defining security, fields for defining workflow status, fields for defining calendars, respectively.

TABLE 14

GENERAL FIELDS IN THE h_PageUI FORM

| Field Name | Description |
| --- | --- |
| h_Authors | Names of Authors who can edit the document. This is a particularly important field when creating PlaceBots which modify the access control to documents. |
| h_CurrentSkinName | Name of the Theme to be used in the page |
| h_CurrentSkinType | Name of the Skin to be used, such as Edit: "h_Edit", or for a custom Theme the ID: "c_E4257D50EE2DD800C12569440019C164" |
| h_FolderUNID | The system name of the folder the page belongs to. For example: "4695CA1530263B3AC1256946005E965C" -the internal code for a Folder, or ""when the page only appears in the TOC. |
| h_Form | The id of the QuickPlace-Form used to create the page, for example: "30DF3123AEFAF358052567080016723D" Note, that the form referred to here is actually a data note and not a Notes Form. |
| h_IsInToc | If the page should appear in the TOC, it is set to "1". If it does not appear there, it is set as "". |
| h_IsPublished | Set to "1" if the page should be visible to readers. |
| h_IsSystem | 1 = This is a system object. |
| h_Name | The user visible name of this object. |
| h_Position | Number used to sort the pages within the TOC. These typically have values such as 10000. This value should be handled as a Long when referenced in LotusScript. |
| h_SystemName | The name of this object as known to the system. |
| h_Type | Describes what sort of note defines. This field is used in all Quickplace Design Notes to tell what sort of document is being referred to. It is what differentiates between the Objects in QuickPlace. "0" = Page "1" = Folder "2" = Room "3" = Subroom "4" = Error Page "5" = RoomType "h_Agent" = PlaceBot "h_Member" = Member "h_HaikuType" = "h_Group" = Group "h_Form"= Form "h_Field" = Field "h_Skin" = Layout file "h_SkinGroup"= Skin Group. h_Name Name of the page. |
| h_Originator | User name of the creator, such as "CN = User Name/OU= QuickPlaceName/OU=QP/O=ServerName" |
| h_TextAbstract | The abstract automatically created to summarize the page. This is useful in JavaScript for displaying a summary of the text content in a document. |
| PageBody | The content or "body" of the page. If using the JavaScript "document.write" method to write out HTML content in a QuickPlace element, such as an imported page, skin and so on, it is normal to do |

TABLE 14-continued

GENERAL FIELDS IN THE h_PageUI FORM

| Field Name | Description |
|---|---|
| | this via the PageBody field. This field can be printed onto the screen via a document.write (PageBody) method called in a QuickPlace document. To do this in a page, the document.write method is used to print the contents of this field to the page. |

System objects have special meaning depending on the type of object. The following tables describe fields in various QuickPlace Object types.

TABLE 15

FIELDS USED TO DEFINE PUBLISHING

| Field Name | Description |
|---|---|
| h_IsPublished | 1 = This object is currently published |
| h_IsHidden | 1 = This object is not shown to the user |
| h_SetReadScene | The name of the default scene (subform) to use when viewing this object |
| h_SetEditScene | The name of the default scene (subform) to use when editing this object |
| h_PublishedVersionUNID | If this object is being edited and the current object is the draft version, the UNID of the published version of this object. |
| h_DraftVersionUNID | If this object is being edited and the current object is the published version, the UNID of the draft version of this object. |
| h_LastTimePutAway | The last time that this object was changed: Published or Saved under construction. |

TABLE 16

FIELDS USED TO DEFINE FOLDERS LOCATION

| Field Name | Description |
|---|---|
| h_FolderUNID | The name or UNID of the Notes Folder where this page resides. |
| h_IsInToc | 1 = This object is shown in the Table of Contents (sidebar). |
| h_CurrentPosition | The position of this object with respect to other objects in the collection. |
| h_SetParentUNID | If this is a child or response object, the UNID of the parent object. |

TABLE 17

FIELDS USED TO DEFINE SECURITY

| Field Name | Description |
|---|---|
| h_Readers | If this object is protected from readership, the list of names, groups, and or roles that can read this object. |

TABLE 17-continued

FIELDS USED TO DEFINE SECURITY

| Field Name | Description |
|---|---|
| h_Authors | If this object is protected from authorship, the list of names, groups, and or roles that can author this object. |

QuickPlace Object Model and HTML: Building URLs

Building URLs in a QuickPlace is an important issue, due to the fact that QuickPlace is a browser based application. Understanding QuickPlace URLs is also a good way of understanding the object hierarchy in QuickPlace. The relationship between URLs and the QuickPlace Object model flows in both directions. Understanding the structure of URLs helps understanding the QuickPlace Object model. Conversely, once the QuickPlace object model is understood, how to use URLs to manipulate a QuickPlace becomes apparent.

URLs in QuickPlace use the same structure as in Domino. Domino URLs allow locating documents by using the key value of the first sorted column of a view, then generate a URL to link to a document using this key. Once the documents are located, they are not always opened in the browser. Sometimes they are read and their contents exposed and used by other objects.

An example of locating a file without opening it is when a QuickPlace skin accesses a JavaScript LSS file. The user never sees the LSS page, but its contents are used by the visible page to render objects and perform functions. To locate a document in Domino, the initial part of the URL is pointed to the host server, then the database containing the required document. The next part of the URL must point to a view with the first column specified as being sorted. This first, sorted column becomes the key column. Then a URL is used to open the document, as in the following example:

http://Host/Database/View/Key?DominoURLCommand

Where

View: is the name of the view. To access a document regardless of the view, substitute a zero (0) for the view name and specify the document by its universal ID.

Key: is the string, or key, that appears in the first sorted or categorized column of the view. If the key has spaces in it, substitute these for plus signs when creating a URL.

This syntax is used to open, edit, or delete documents and to open attached files. Domino returns the first document in the view whose column key exactly matches the Key. There may be more than one matching document; Domino always returns the first match. The key must match completely for Domino to return the document. However, the match is not case-sensitive or accent-sensitive.

DominoURLCommand: Is the instruction to Domino of what to do with the file when found. For example, ?OpenDocument, ?EditDocument and ?DeleteDocument.

If this DominoURLCommand is omitted a default will be substituted. For example, in the previous URL if the OpenDocument argument is omitted in a URL command the document will still open because the command is automatically interpreted as OpenDocument.

The structure of URLs in a QuickPlace is the same as in any Domino database. QuickPlace objects are quite often referred to via relative URLs. For example, to reference a page that has been created, the following syntax is used:

../../h_View/PageName?OpenDocument

Where: "../../" section at the front of the URL creates a relative URL, is interpreted by the Domino server as referring to the parent objects of the current object (h_View and PageName).

Examples http://www.mercury.com/register.nsf/Registered+Users/Ja y+Street?OpenDocument http://www.mercury.com/register.nsf/0/466c5172561e1c5c8 52566c2005f6bbb?OpenDocument Many QuickPlace objects in QuickPlace have internal names beginning with "h_". This is refers to the internal name of QuickPlace which is "Haiku". To reference images, JavaScript library files or files other than pages, the following syntax can be used . . .

../../h_Index/Document+Name/$File/Imagename.gif?OpenElement

Or . . .

../../h_Index/Document+Name/$File/ScriptLibName.js?Open Element

Many objects in QuickPlace can be located via the h_Index View. It contains links to many of the published objects in a QuickPlace. When referencing a JavaScript file the ?OpenElement argument is used. This is to tell Domino that the file being accessed is not a page to open, which is the default action.

Overviev: Whatsnew

In accordance with a further embodiment of the invention, a user can at any given time inquire of QuickPlace what has been changed, such as membership, pages, and so forth, and receive a report with respect to those aspects the user is authorized to access.

Overview: Same Time, or Chat

In accordance with a further embodiment of the invention, integrated with QuickPlace are synchronous based communications allowing users to identify and communicate directly with other users visiting the same place.

Overview: Quick Browse

In accordance with a further embodiment of the invention, selection of quick browse opens a new window and creates a set a links to control the main window without losing the context. Context appears in a separate window in a simpler HTML format. Selection of an item in that separate window, causes the page or room (if link is to a room) to be displayed in the main window. QuickBrowse is a window that can be popped up by clicking a remote control selector, such as a button or icon, in search results and in whatsnew. It enables users to browse links generated by these functions in a random-access order. When the user clicks a link in the quickbrowse window, the main window is reloaded with the target page. This is distinguished from Quick search, which is the search field and green button that is embedded in QuickPlaces like in most web sites, so that users can enter a search term and perform a search in a single click—i.e., without first having to go to a special search page.

Anatomy of a QuickPlace Theme

Each theme is composed of a group of layouts that define the appearance of specific QuickPlace components. For example, the layout for a page differs from the layout of a folder, but they will probably share some style elements as part of a common theme. Table 19 sets forth the layouts and style sheet of a QuickPlace theme.

TABLE 19

SKIN GROUP COMPONENTS

| Layout | File type | Purpose |
| --- | --- | --- |
| Page | .htm | Defines the appearance of a page being read |
| Page editing | .htm | Defines the appearance of a page being edited |
| List folder | .htm | Defines the appearance of a List or Response folder |
| Headlines folder | .htm | Defines the appearance of a Headlines folder |
| Slideshow folder | .htm | Defines the appearance of a Slideshow folder |
| Stylesheet | .css | Defines styles such as fonts and colors for all layouts |

In most cases, a single theme can be used to customize the look of page, list folder, and slideshow folder. Additonally, JPEG or GIF graphic files can be imported to represent a theme in the Custom Theme Gallery.

Table 20 shows the components that can be customized for each layout.

TABLE 20

CUSTOMIZABLE LAYOUT COMPONENTS

| Component Name | Page | List folder | Slideshow folder | Headlines folder | Edit |
| --- | --- | --- | --- | --- | --- |
| Logo | x | x | x | x | x |
| Page content | x | x | x | x | x |
| Actions | x | x | x | x | x |
| Help | x | x | x | x | x |
| Table of Contents | x | x | x | x | |
| Path | x | x | x | x | |
| QuickSearch | x | x | x | x | |
| WhatsNew | x | x | x | x | |
| AdvancedSearch | x | x | x | x | |
| SignIn | x | x | x | X | |
| Offline | x | x | x | x | |
| Chat | x | x | x | x | |
| Notify | x | x | x | x | |
| Print | x | x | x | x | |
| Tutorial | x | x | x | x | |
| PageTitle | x | x | | Note 1 | x |
| Navigation | x | x | x | Note 2 | |
| Jump | Note 3 | x | x | Note 2 | |
| AuthorandModified | x | Note 3 | x | x | |
| Revision | x | Note 3 | x | x | |
| HeadlinesFolder | | | | x | |

Notes:
1. Although the PageTitle component can optionally be included in a Headlines folder, this component would normally be omitted and the page title displayed prominently instead.
2. The Headlines Folder is designed to provide a headlines style of navigation in place of the previous/next navigation used in other folder types. Therefore, the Navigation and Jump components are not normally used in the Headlines Folder layout.
3. The Jump component can be included in the Page layout and the AuthorAndModified and Revision components in the ListFolder layout. These components will all display as "empty", using the HTML parameter emptyFormat.

Modifying an Existing Theme

In accordance with a preferred embodiment of the invention, a QuickPlace theme is customized by beginning with the theme closest to what is desired, extracting the HTML source files for the theme, customizing them, and uploading the modified files as a custom theme.

Style Sheet Selectors in QuickPlace

Figure 12:
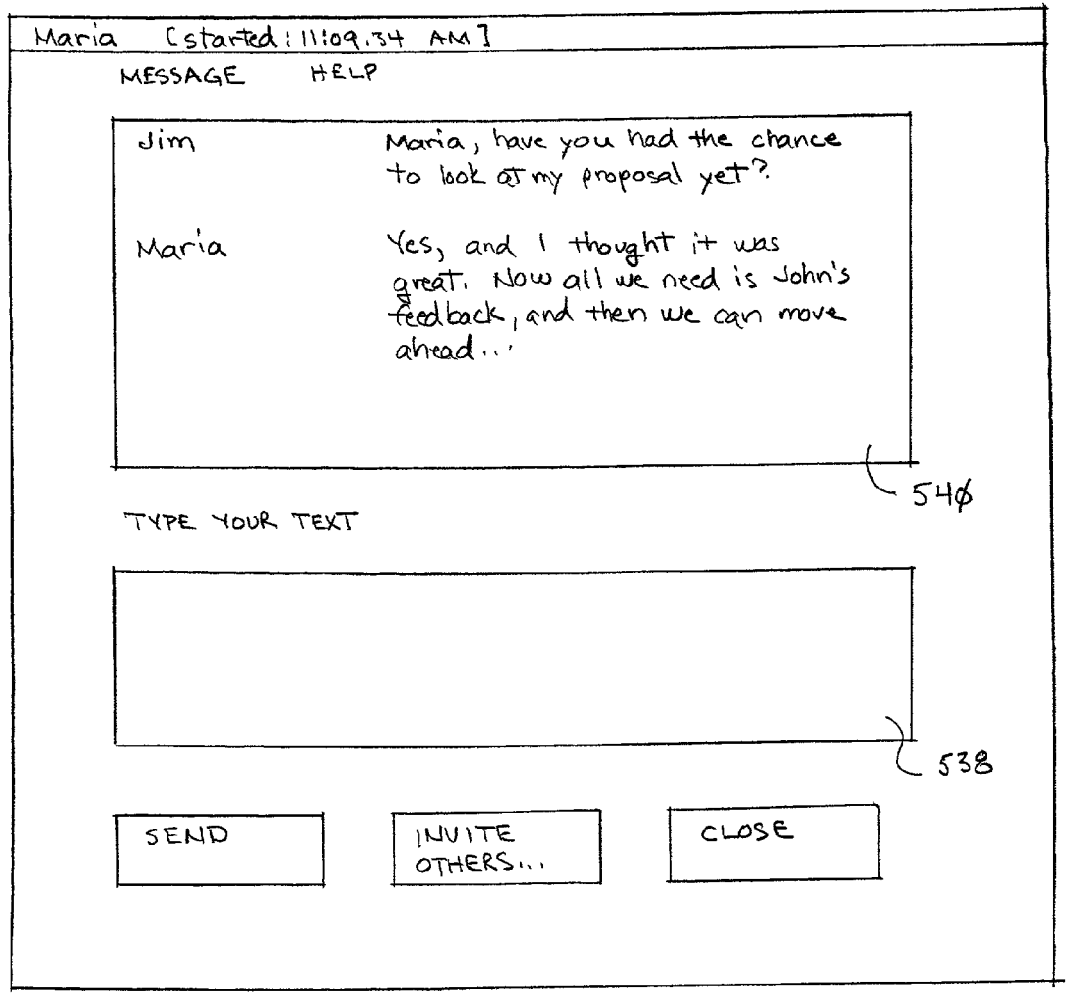
FIGS. 12–13 are schematic representations of user interfaces implementing chat.

Referring to FIG. 12, a typical QuickPlace user interface 370 includes a sidebar (TOC) 372, page title 374, author and modified field 376, actions bar 378, logo 380, path 382, page content 400, and actions buttons, such as quick search 384, advanced search 386, whatsnew 388, chat 390, notify 392, print 394, tutorial 396 and help 398. Each of these is customized by using tags or selectors which deal with borders, background, text, and so forth, in accordance with a style sheet.

A standard default stylesheet is always output with any theme, so that one need only to specify the selectors that are to be changed. Undefined properties will fall back to those defined in the default stylesheet.

Tables 22 through 32 describe Style Sheet (CSS) Selectors.

TABLE 22

Tag Styles

| CSS Selector | Description and Notes |
| --- | --- |
| body, td | Default text style. Note: specify both tags to set the default text style. |
| a | Anchor style. Note: see also several other more specific anchor styles, below. |
| a:hover | Default style of anchors when mouse is over the anchor. Note: IE only. |
| form | Default style of forms. Note: The margin-bottom property is set to 0px by default to remove unwanted whitespace from the bottom of all forms. |

(Note: Other tags, such as h1, h2, etc., can also be styled as needed.)

TABLE 23

Page Background

| CSS Selector | Description and Notes |
| --- | --- |
| .h-page-bg | Page background. Note: class assigned to body tag of all pages. For IE only, the margin properties can be set to control the page margin. |

TABLE 24

Folders, What's New, Search Results, Tasks (list view)

| CSS Selector | Description and Notes |
| --- | --- |
| .h-folderBanner-bg | Background of folder banner. Note 1. |
| .h-folderBanner-text | Text in folder banner. Note 1. |
| a.h-folderBanner-text | Anchors in folder banner. Note 1. |
| .h-folderBannerSelected-text | Text of selected ("current") item in folder banner. Note 1. |
| a.h-folderBannerSelected-text | Selected anchor in folder banner. Note 1. |
| .h-folderItem-bg | Background of items listed in folder. Note 1. |
| .h-folderItem-text | Text of items listed in folder. Note 1. |
| a.h-folderItem-text | Anchor listed in folder. Note 1. |
| .h-folderCompact-text | Compact text of item listed in folder. Note 1. |
| .h-folder.Abstract-text | Abstract text of item listed in folder. |
| .h-folderBar-bg | Background of bar to left of a thread. |
| .h-folder-dl { | Indentation of responses in response folder. Note: by default, the margin-bottom property is set to 0px to remove unwanted whitespace below indented items in response folders. |
| .h-folderInterspace-bg {} | Background color of vertical space between responses. |
| .h-folderInterspace-text { | Height of vertical space between responses. Note: use font-size to set the height. |
| .h-folderSpace-text { | Height of vertical space between threads. Note: use font-size to set the height. |

Note 1: This style is used for the banner that displays column titles, as well as other banners in What's New, Search Results, etc.

TABLE 25

What's New

| CSS Selector | Description and Notes |
| --- | --- |
| .h-whatsNewBanner-bg | Background of outer box in right column of What's New. |
| .h-whatsNewBanner-text | Text of outer box in right column of What's New. |
| .h-whatsNewBox-bg | Background of inner box in right column of What's New. |
| .h-whatsNewBullet-text | Bullet to left of items listed in What's New. |

TABLE 26

QuickBrowse "remote control" window

| CSS Selector | Description and Notes |
| --- | --- |
| .h-quickBrowseTitle-text | Title displayed in QuickBrowse window. |
| .h-quickBrowseBullet-text | Bullet to left of items listed in QuickBrowse. |
| .h-quickBrowseItem-text | Text listed in QuickBrowse. |
| a.h-quickBrowseItem-text | Anchor listed in QuickBrowse |
| .h-quickBrowseNav-text | Navigation link displayed in QuickBrowse. |

TABLE 27

Tasks (timeline view)

| CSS Selector | Description and Notes |
| --- | --- |
| .h-tasksBannerNow-textbg | Highlighted current date in Tasks banner. |

TABLE 27-continued

Tasks (timeline view)

| CSS Selector | Description and Notes |
| --- | --- |
| .h-tasksItem-bg | Background of items listed in Tasks. |
| .h-tasksItemTimeline-bg | Highlighted period of a task. |
| .h-tasksItemMilestone-bg | Highlighted period of a milestone |

TABLE 28

Calendar

| CSS Selector | Description and Notes |
| --- | --- |
| .h-calendarLabel-text | Date label. |
| .h-calendarLabelSelected-text | Date label (today's date). |
| .h-calendarItemOther-bg | Background of day not in current month. |
| .h-calendarItemToday-bg | Background of today's date. |

TABLE 29

Text and fields in Page layout

| CSS Selector | Description and Notes |
| --- | --- |
| .h-field-text, .h-field-text td | Style of the text value of a field. Note: use this exact selector, as shown, to style field text distinctly from regular page content. |
| .h-pageSmall-text | "Smallprint" page text. |
| .h-fieldSmall-text | "Smallprint" text content of fields. |
| .h-fieldHeader-bgtext | Field header. |
| .h-fieldOrder-bgtext | Number to the left of the field header. |
| h-page-text a:visited | Anchors inside the pageContent skin component which have been visited. Note: IE only. |

TABLE 30

Edit Layout

| CSS Selector | Description and Notes |
| --- | --- |
| .h-fieldHeaderEdit-bgtext | Field header |
| .h-fieldEdit-text, .h-fieldEdit-text td | Field description text. Note: use exact selector, as shown. |
| .h-fieldOrderEdit-bgtext, div .h-fieldOrderEdit-bgtext td | Number to the left of the field header. Note: use exact selector, as shown. All properties in this selector must be marked ! important to take effect. E.g., color: green! important. |
| .h-fieldSmallEdit-text | Small field text. Note: all properties in this selector must be marked ! important to take effect. |
| .h-fieldSpecialEdit-text | Special field text. Note: used in Task Info field. All properties in this selector must be marked! important to take effect. |

TABLE 31

QuickSearch

| CSS Selector | Description and Notes |
| --- | --- |
| .h-searchField-text | Style of the text field associated with the quickSearch skin component. |

TABLE 32

Classes defined by the default theme
The classes listed below are not built in to QuickPlace, but are defined by the default theme's stylesheet. (Custom themes are not required to use these classes, and are free to define any other classes as appropriate.) However if modifying the default theme, these classes can be modified to get a particular effect.

| CSS Selector | Description and Notes |
| --- | --- |
| .h-logo-text | Logo text. |
| .h-heading-textbg | Heading about table of contents and tools boxes. |
| .h-sidebar-bg | Background of table of contents and tool boxes. |
| .h-toc-text | Text of item listed in table of contents. |
| .h-tocSelected-text | Text of selected item listed in table of contents. |
| .h-nav-text | Navigation link. |
| .h-tool-text | Tool link. |
| .h-signIn-text | Sign In link. |
| .h-actionButtonBorder-bg | Border of action button. |
| .h-actionButton-bg | Background of action button. |
| .h-actionButton-text | Text of action button. |
| .h-actionSpace-text | Space between action buttons. |
| .h-pageTitle-textbg | Page title. |
| .h-pageAuthorMod-text | AuthorAndModified text. |
| .h-revision-text | Revision link (draft | published). |
| .h-revisionSelected-text | Selected revision link |
| .h-accent-bg | Accent color. E.g., used in rule at bottom of page. |
| .h-headlineFolderTab-bg | Background of unselected tab in headline folder. |
| .h-headlineFolderTab-text | Text of unselected tab in headline folder. |
| .h-headlineFolderTabSelected-bg | Background of selected tab in headline folder. |
| .h-headlineFolderTabSelected-text | Text of selected tab in headline folder. |
| .h-edit-bg | Background of edit layout "docket". |
| .h-actionButtonEdit-text | Text of action button in edit layout. |
| .h-actionButtonBorderEdit-bg | Border of action button in edit layout. |
| .h-actionButtonEdit-bg | Background of action button in edit layout. |
| .h-shadow-bg | Shadow. Note: used in sidebar and in edit layout "docket" shape. |
| .h-shadowCorner-bg | "Missing" corner of shadow area. |

File System Directory Architecture

Figure 8:
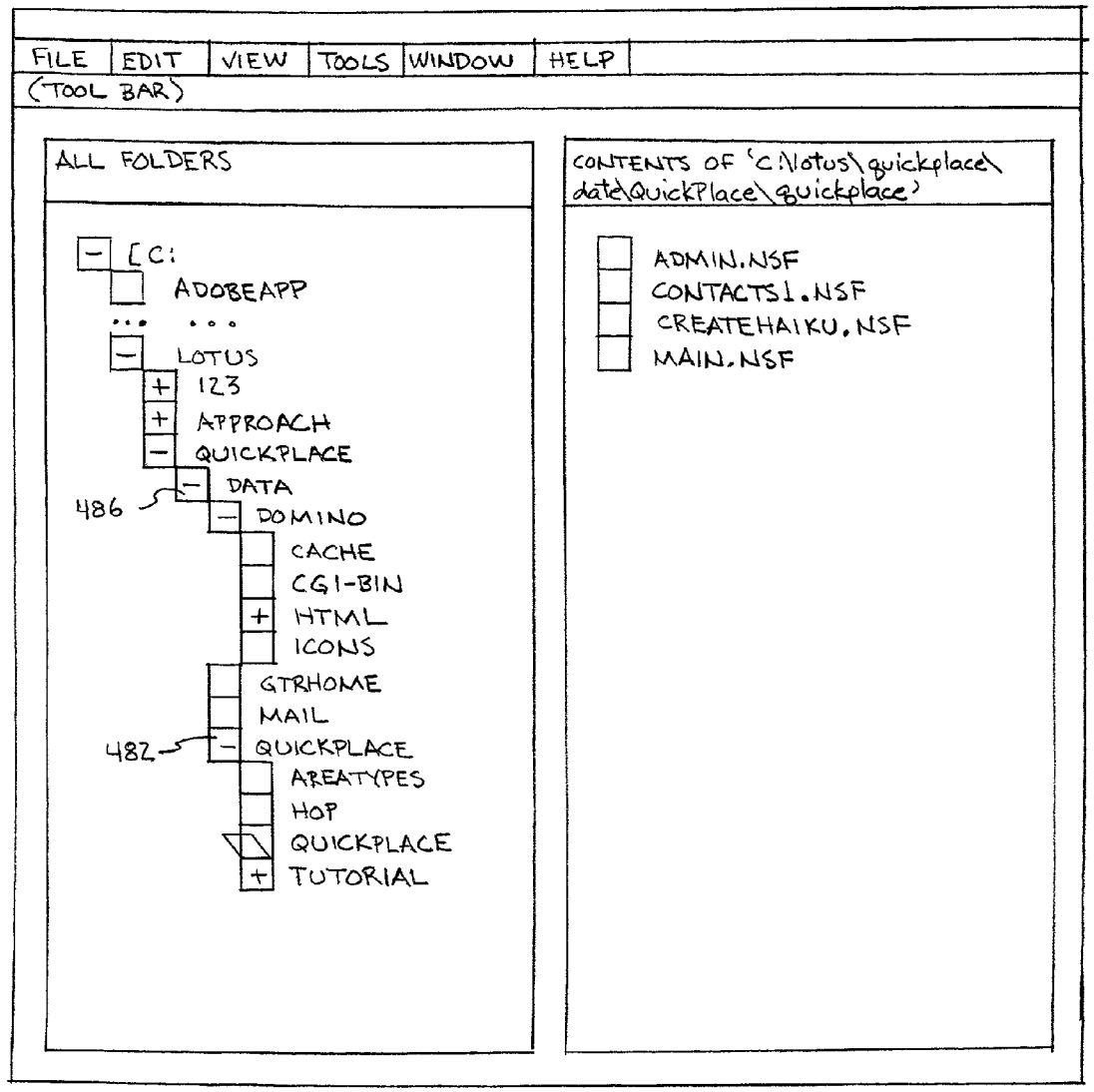
FIG. 8 is a schematic representation of a directory structure, along with the files in an exemplary collaboration space server.

In accordance with the preferred embodiment of the invention, every new QuickPlace created gets its own directory under the QuickPlace master directory. The name of that directory is same as the name of the QuickPlace. Each additional room in the QuickPlace is another file (.nsf) in the QuickPlace directory. During the QuickPlace server installation, the default QuickPlace (also called the "Welcome" QuickPlace) with the name of QuickPlace is automatically created. This is the entry point to the QuickPlace server including the server administration. FIG. 8 shows the directory structure, along with the files in "Welcome" QuickPlace, in a stand-alone QuickPlace server.

For example if Millennia is the a current QuickPlace, then the basic infrastructure of the Millennia QuickPlace resides under \lotus\domino\data\quickplace\millennia (on Domino server—given that \lotus\domino\data is the data directory) or \lotus\quickplace\data\quickplace\millennia (on stand-alone—given that \lotus\quickplace is the QuickPlace installation directory).

When QuickPlace server is installed, the "Welcome" region or the "Administrator's Place" is pre-configured to allow an entry point to the QuickPlace server. An administrator can then administer the newly installed QuickPlace server from this entry point. This so called administrative QuickPlace resides under the QuickPlace directory which in turn is under the data directory. For an example it is c:\lotus\domino\data\QuickPlace\QuickPlace When installed under domino, and c:\lotus\QuickPlace\data\QuickPlace When in stand-alone mode. It contains the following files: Main.nsf, Contacts1.nsf, CreateHaiku.nsf, Admin.nsf. The templates for these Domino databases reside in the directory named AreaTypes. The "Welcome" page may be configured to suit the needs of an organization.

Security

The security can be controlled at two levels: (1) from the server's administration perspective—Managing the QuickPlace server; and (2) from each QuickPlace's perspective—Managing a QuickPlace.

A server administrator can restrict who can create a new QuickPlace on the server and also who can administer the QuickPlace server. The SSL encryption can also be controlled by the server administrator. The SSL encryption is effective server wide and cannot be controlled at a QuickPlace level. All this can be accomplished via security screen. At the QuickPlace level, the administrator can control who can read the information, which users can create the information, and who can administer the particular QuickPlace. Anonymous allows everyone access without authentication.

What's New

It is a characteristic of busy collaboration spaces that many things are happening in different rooms, and it isn't obvious what those things are. There is a need to for a system and method for providing users of collaboration space knowledge of events and happenings throughout the place that are of current interest, including scheduled events or tasks that current, and what has been recently changed.

In accordance with a preferred embodiment of the invention, a user may receive a report of what is new, either scheduled or on request, such as bey clicking on a place or an E-mail component. What ever is selected, the displayed result is personalized to the individual user, including security. The scope of the what's new page may be, for example, user specified as daily or weekly.

A what's new display, in accordance with this embodiment of the invention, extends to all elements, such as pages, tasks, events, folders, rooms, members, groups, today's events & tasks due, and email received.

A what's new time line may include, for example a period including today plus the preceding seven days and the succeeding seven days, so as to anticipate further events and tasks due.

Figure 11:
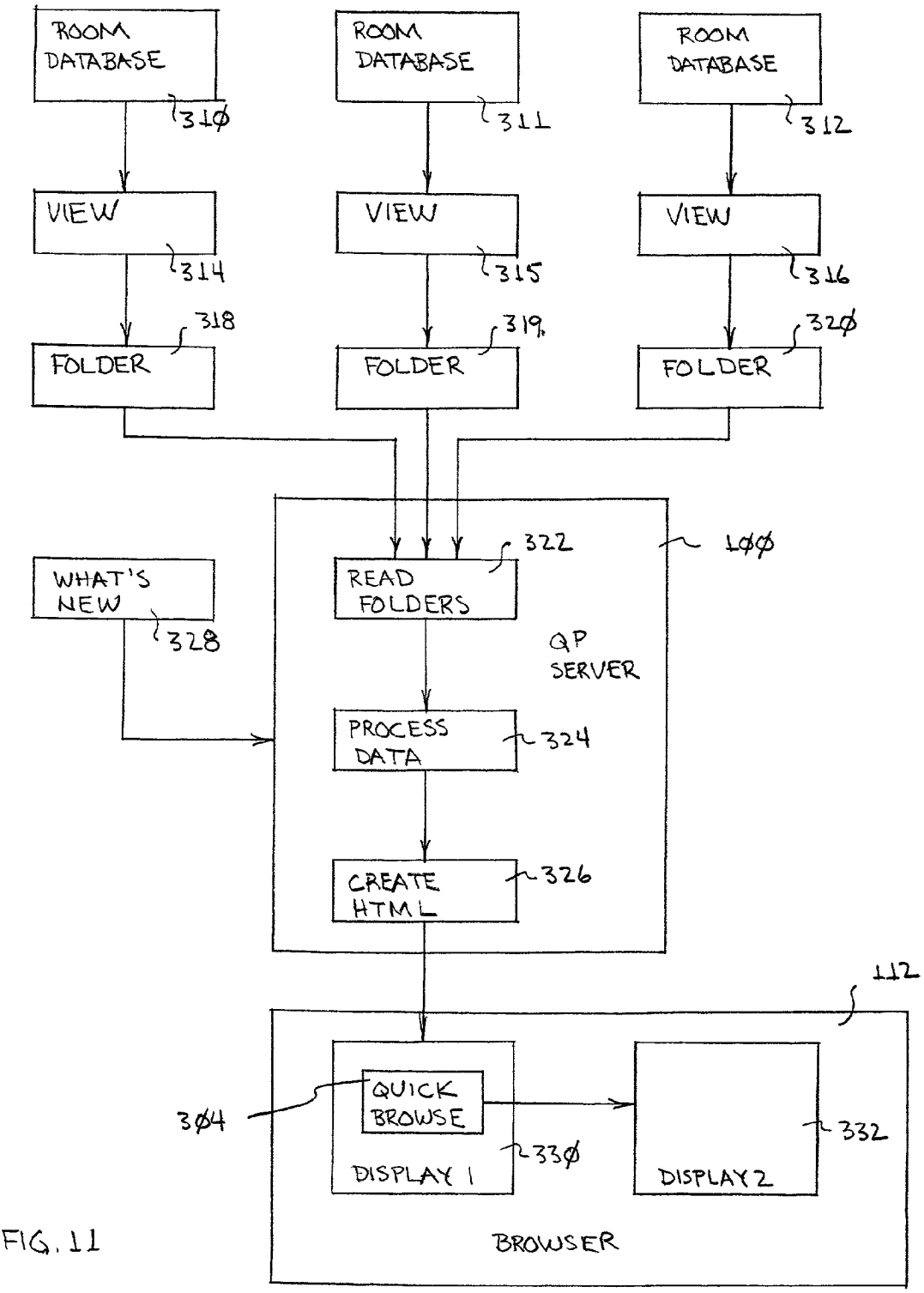
FIG. 11 is a flow chart representation of quick browse and what's new.

Referring to FIG. 11, each room in collaboration space is implemented as a database 310–312. A Notes view 314–316 and folder 318–320 is associated with each such database. Using notes security, each person looking at view sees what is authorized to see. Folder 318–320 is updated every night, for example, by taking a snap shot of view 314–316. This update can also be done upon request, which will cause view 314–316 to be immediately copied to folder 318–320. When each user request for what's new, filtering on user authorization and scope occurs.

A manager can configure a newsletter, deciding whether to send e-mail, each part of its contents, and its frequency, such as daily or weekly. The manager can customize what people can get via E-mail, and each member can accept or disabled the E-mail.

Nightly, for example, QuickPlace updates what's new, sends newletter (which may be implemented, for example, as IIS, Microsoft stack) and cleans up returned email.

Referring to FIG. 11, a place comprises a plurality of rooms, each room represented, respectively, by a room database 310–312. Each has a view 314–316, respectively, which views are maintained up to date per formula. These views, when updated, such as every night and whenever someone updates, are copied into respective folders 318–320. When a user asks what's new in step 328, in step 322 QP server 100 opens the contents of folders 318–320, in step 324 processes the data, using access control list and other Notes security, and in step 326 generates HTML from that data to reorganize it for display 330. Step 326 html is created with all links and, in a preferred embodiment of the invention, quick browse feature 304 in window 330 which, upon user selection, generates display 332 presented at browser 112. This is just the on-line part. Off line, step 326 is create and send mail (not html), which it does on behalf of each member of the room. User selection of quick browse 304 opens a new window 332, creates a set a links to control the main window 112 without losing the context. Context appears in a separate window 332 in a simpler html format. Selection of an item in that separate window 332, causes the page or room (if link is to a room) to be displayed in the main window 112.

In accordance with a further embodiment of the invention, a team version of a what's new newsletter can also be collected in the QuickPlace, enabling users to browse a set of changes efficiently, and to review past newsletters. Users can also click quick-search links to answer common queries such as "what's changed in this QuickPlace today?".

News Email provides an overview simple enough that it's useful to receive and quick to scan through. It may be composed and delivered nightly, weekly, or monthly. The wording of summary may be adapted to period of each "issue", personalized to include only changes that user has access to, exclude pages that have specialized read/edit permissions, displays several sections, and sent in dual mime-typed format—plain text and HTML (no images).

Examples of these E-mail formats are set forth in FIG. 11, and may include plain text with links (having a link for every "news item" reported, plain text no links (having global links to the QuickPlace, but no links for reported news items), plain text with shortened URLs (requiring shortened URLs for links into QuickPlaces), and HTML for viewing what a client selects.

In an exemplary embodiment of the invention, a news folder offers a good overview. Such a folder may be saved at a manager's option in a specialized list folder that QuickPlace creates for the purpose. If the folder is later hidden, old issues of news may be retained, or the manager given the option to keep or delete them. The folder only captures news while it is visible and opens to latest issue of News. A user can thus use a folder icon to view the list. A Quick Browse button in action bar of News folder opens same links as shown in current folder state, simply laid out, into separate window for browsing. Such a news folder, similar to email HTML format, is enhanced to includea set of quick-browse search links, and folder instructions.

In accordance with further embodiments of the invention, what's new is access-controlled on the fly, so it matches the E-mail version for each user—i.e., each item in each news "issue" is a page, and each issue is a filter onto a view. The page is a document that provides a link to the original page, wherever it is, with the same ACL. Otherwise, the stored version will be in the form of one page per issue, each page in the format shown in the prototype.

In a further embodiment of the invention, what's new reports 530 are accompanied by a generic site map 534, a TOC tree without the leaves, access-controlled for the current user.

Quick Browse

In accordance with a preferred embodiment of the invention, a system and method is provided for enhancing browsing in collaboration space of collections of links. These link collections exist in a variety of formats which users need to be able to quickly visit in any order. For example, a random access UI is provided to What's New and Search Results links. These items can reside in more than room, producing potentially brutal context switches from one link to the next. Also, newcomers or casual users of the collaboration space have trouble knowing how to get started and where they can go in a QuickPlace, and are assisted by the presence of quick-browse windows, such as (1) live "go there" links from the Tutorial (in a window) to specific locations, (2) live "go there" links from Help to specific locations, and (3) a generated Sitemap (a simple rendering of the access-controlled TOC hierarchy). Further, support is provided for random-access browsing of the links in any folder as a set.

Figure 14:
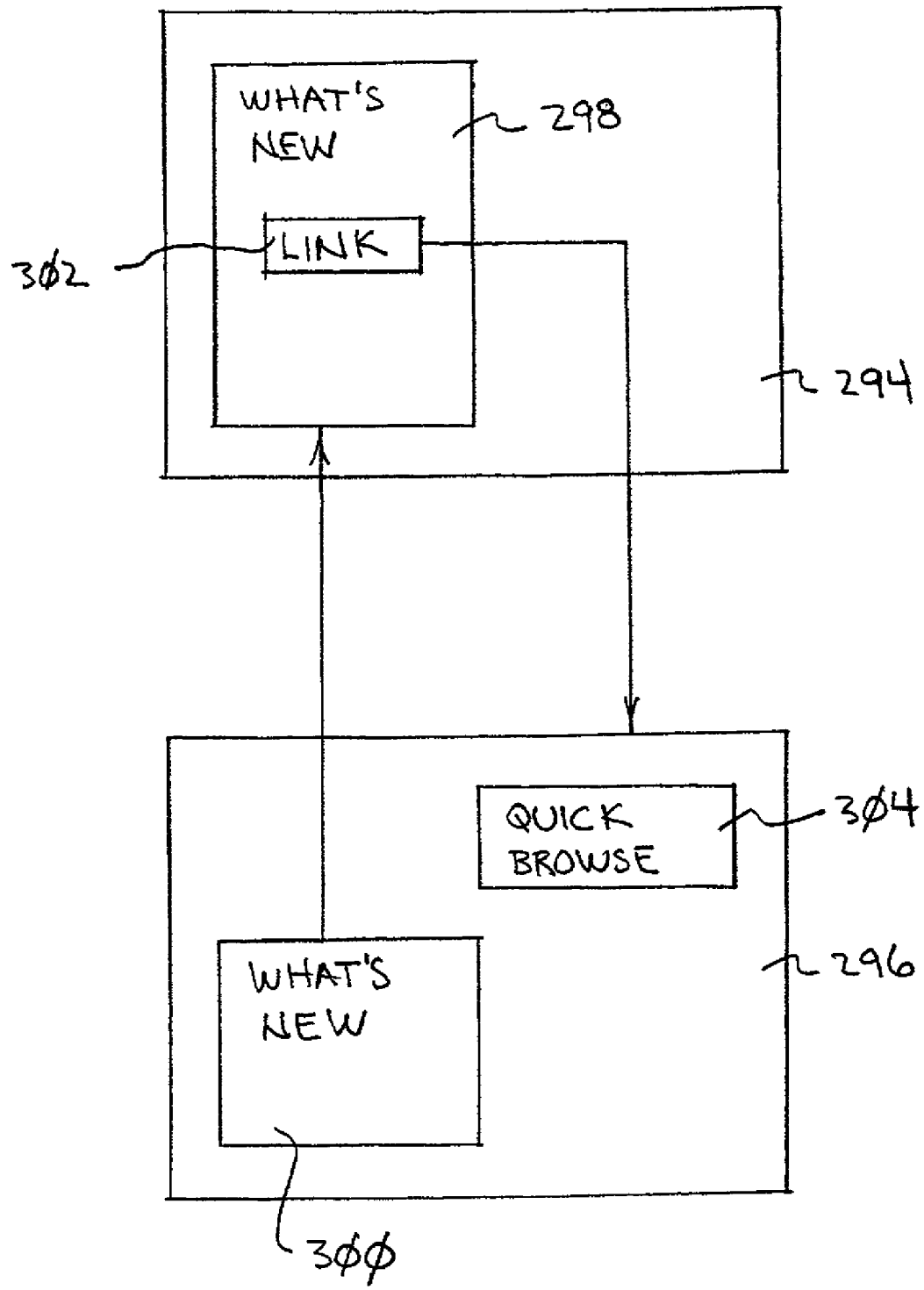
FIG. 14 is a flow chart illustrating quick-browse implemented as a remote control user interface mechanism.

Referring to FIG. 14, in accordance with a preferred embodiment of the invention, quick-browse is implemented as a "remote control" UI mechanism 304. A Remote Control link/icon is displayed in any context 296 that supports it, such as Search Results and What's New. When the user clicks the remote control link 302, such as button 536 (FIG. 10), or 532 (FIG. 9), a window 296, 330 opens with a compact set of links 304 to browse. When the user clicks a link in the remote control 304, the main QuickPlace window 330 is redirected to the linked page 332. Other contexts such as the Tutorial and Help may themselves act as specialized versions of the remote control by opening into a separate window. For example, the tutorial is implemented as a set of pure HTML files which can be customized/switched by third parties. Some links from the tutorial may use the same mechanism to open links in main window.

Clicking the remote control icon opens a quickbrowse window, containing one or more links. Upon being clicked, these links open in the main QuickPlace window; therefore the QuickBrowse window acts like a remote control onto the main window. This allows the set of hits to remain available as the user browses around, in any order. What's New and Search Results generate links that can be anywhere in a QuickPlace—i.e., in any of possibly many different rooms. The QuickBrowse window is an attempt to bring some coherence to the experience of jumping around all over the QuickPlace.

Figure 9:
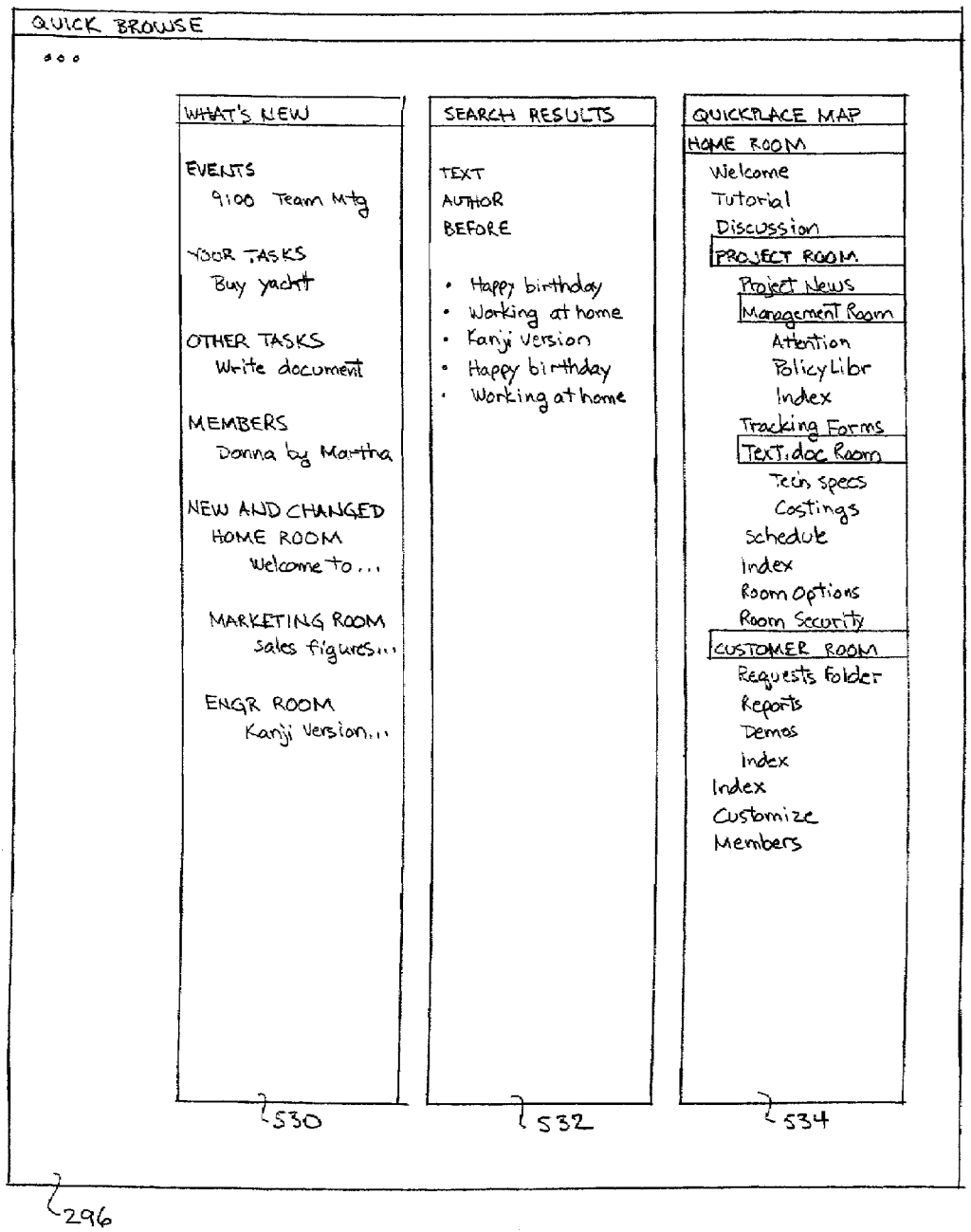
FIGS. 9–10 are schematic representations of a user interface illustrating quick browse.
Figure 10:
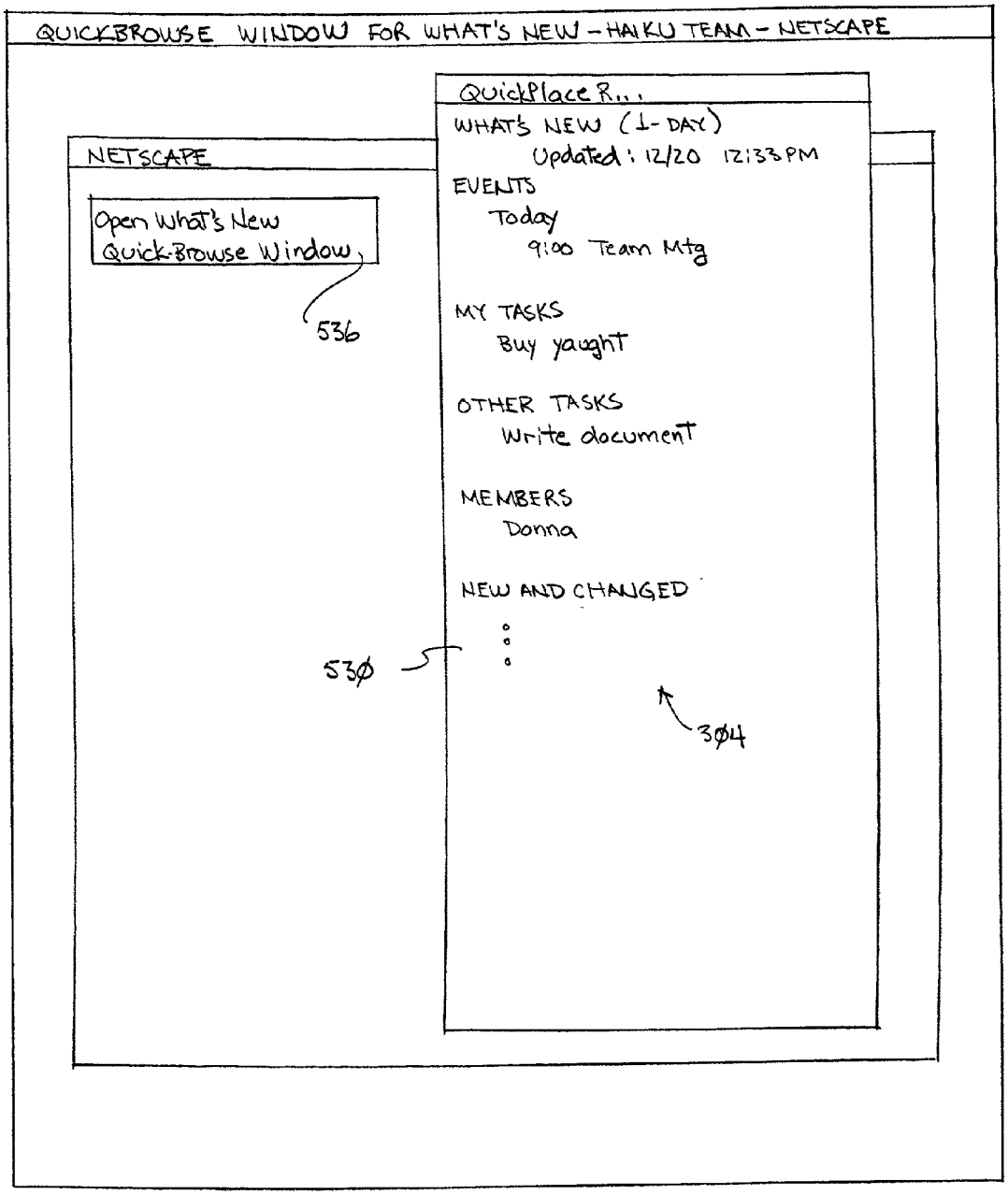

Referring to FIG. 9, renderings of the contents of the remote control window for What's New 530, Search Results 532, and a site map 534, are illustrated.

Communicating with other Members: CHAT

In accordance with a preferred embodiment of the invention, a manager of a QuickPlace may enabled the chat feature, allowing members to "chat" electronically with other QuickPlace members. Referring to FIG. 12, in a chat session, two or more members exchange messages by typing them in a chat window 538. As soon as the sender finishes typing a message, it appears on the receiver's screen 540. When the receiver replies to the message, the reply appears below the original message on both screens, so all parties have a temporary transcript of the chat session.

A user may start a chat session, respond to an invitation to join a chat session, reply to a chat message, and leave a chat session.

Starting a Chat Session

A member can chat with any other QuickPlace member who currently has the chat window open (or open and minimized). One can chat with one person at a time, two or more people, or everyone who currently has the chat window open.

Figure 13:
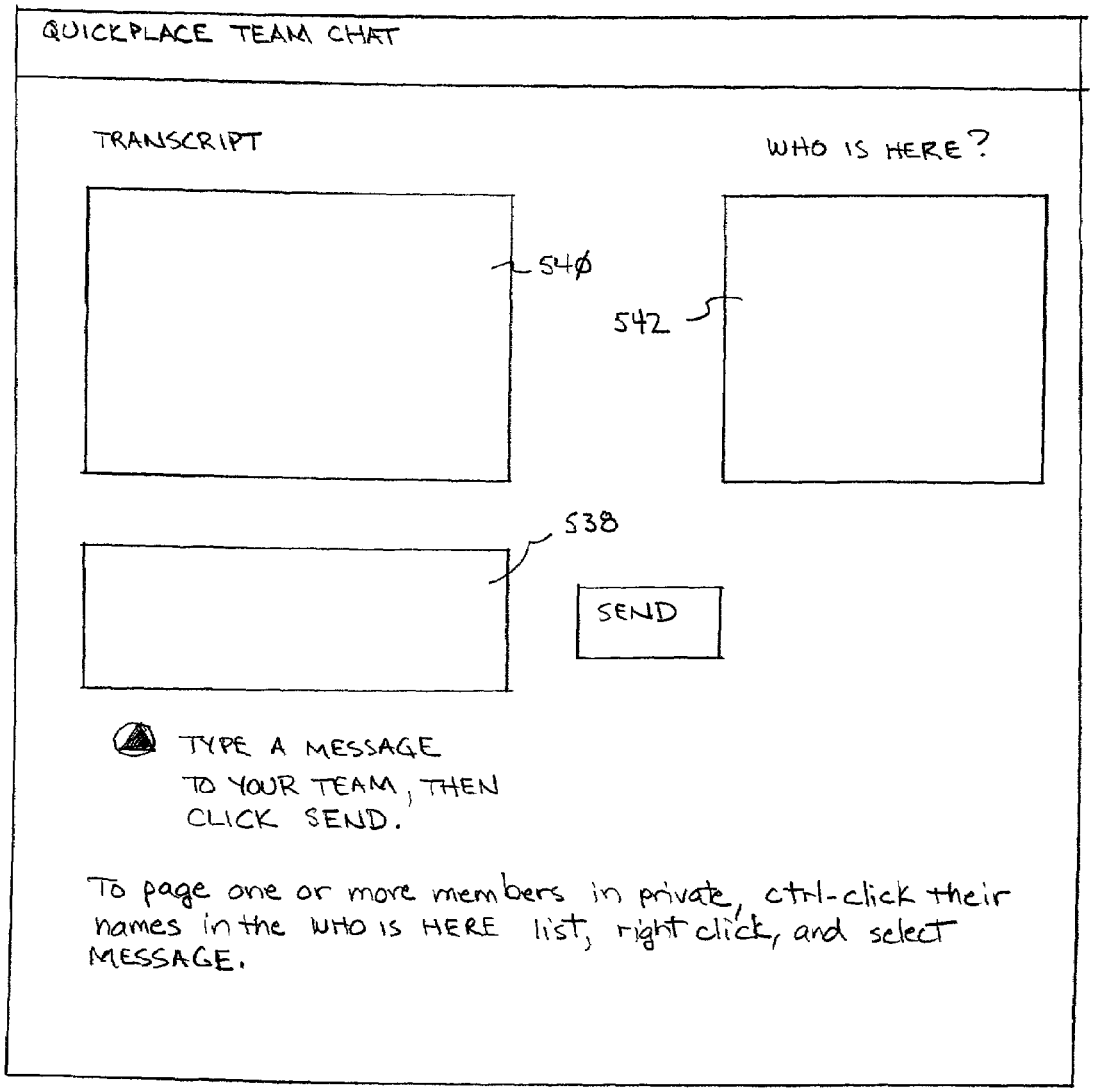

To start a chat session with one other QuickPlace member, a member clicks "chat" 390 (FIG. 12) under "Tools" in the sidebar. Referring to FIG. 13, in the "Who is here?" section of the QuickPlace Team Chat window that now appears on the screen, the member double-clicks the name of the person with whom to chat. In the box 538 labeled "Type your text" in the new window that appears on the screen, the member types the text of the message to be sent. Pressing Enter or clicking send sends the message. The message is sent and displayed in the chat transcript area 540. When the member receives a reply to the message, the reply appears in the same area 540. The chat session may be terminated by clicking close or selecting close from a message menu. To remain available for future chat sessions with other QuickPlace members, the QuickPlace Team Chat window 540 is left open or minimized. To dismiss the QuickPlace Team Chat window, the close box for the window is clicked. To initiate another chat session or receive invitations to join chat sessions, it is necessary to reopen the QuickPlace Team Chat window (by clicking "chat").

To start a chat session with two or more QuickPlace members, a member first invites those other members to participate in the session. To create an invitation for two or more members and then start the chat session, the member clicks "chat" 390 in the "Tools" sidebar. In the "Who is here?" section 542 of the QuickPlace Team Chat window that appears on the screen, the member presses and holds the Shift or Ctrl key while clicking the names of the members with to chat. Then, a single-option menu may be selected in which to create an invitation for the chat session entering the subject of the chat in the Topic box, entering the text of invitation in the Message text box, optionally selecting "Secure messages" to prevent anyone outside the Quick- Place from intercepting and reading the messages. The member enters and sends messages and receives replies as above.

To start a chat session with all the QuickPlace members who currently have the QuickPlace Team Chat window open enter and send the message, and it will be sent to all the members listed under "Who is here?" and displayed in the Transcript area.

When a member of a QuickPlace invites a second member to join a chat session, an invitation dialog box appears on your screen of the second member. Using the buttons in the dialog box, the second member can respond privately, join the chat, or decline the invitation. To respond privately—that is, to reply to the sender of the invitation only—click Respond. To accept the invitation, click Join. To decline the invitation and close the invitation dialog box, click Close.

One of two or several participants in a chat session can leave the chat session at any time by clicking Leave or selecting Leave from the Message menu.

Upon signing in, the user can quickly get an overview of who is currently signed in to the QuickPlace. In accordance with an exemplary embodiment of the invention, this is accomplished by displaying a list of names in a separate floating window 542. A user is enabled to control (a) whether or not the chat features actually load on sign-in, so that on low-bandwidth connections in the sametime components don't have to be loaded; and (b) her personal availability state—i.e., whether or not other people can see and chat with her. One UI option is to provide a "Do Not Disturb" button (e.g., in the pathbar)—which logs the user out of the sametime server, turns off all chat features, and toggles itself to display a button labeled "Who Is Here?". To prevent "lurking", the awareness display may be reciprocal—i.e., if user A can see user B, then user B can see user A. The activation state of the sametime features may be kept persistent across sessions: if the user closes the browser with the chat session turned off, then opens another browser window later, the chat session is reopened in its "off" state. In QuickPlace usage it may be desirable provide awareness of who is in the user's current room, versus the entire QuickPlace. A user is able to leverage the current availability of other members to start a chat or other form of communication with them (e.g., phone call). Chats begin by clicking the user's name or via a menu item in that control. The most important type of chat is N-way private chat by invitation—i.e., the user invites one or more people to join in a private chat which other members cannot see and cannot find out is taking place. Users may be allowed to copy the transcripts of a chat into a QuickPlace page, or to save the chat as a whole as a page. An alternative type of chat is a place chat, which in QuickPlace by default is the whole QuickPlace, and may be made to support persistence—i.e., if may be rendered capable of loading the prior transcript when the user opens the chat window.

ADVANTAGES OVER THE PRIOR ART

It is an advantage of the invention that there is provided a collaboration space application model for creating web applications that are aesthetically pleasing and present the user with a simple interface.

It is an advantage of the invention that there is provided a method and system for creating web applications that are instantly created, instantly archived, team and project oriented, easy to use, created, accessed and administered via the Web, reusable, and extensible.

It is an advantage of the invention that there is provided an improved user interface which is quick to load, takes up minimal screen space (at least while the user browses target pages), and which, while browsing a target page from the Quick-Browse setting, allows users to see and access the page's local setting so that they understand the page's context—e.g., its TOC location, folder, parent (responses), and/or ancestors (revisions).

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A computer implemented method for browsing in collaboration space, comprising the steps of:
  presenting to a user a browser interface to said collaboration space;
  responsive to said user opening in said browser interface a main window selectively including context resulting from entry of a search of a selectable object in said collaboration space or in a what's new subset of said collaboration space, presenting a quick browse selector and results of said search in said main window;
  responsive to user selection of said quick browse selector, opening a separate quick browse window;
  searching said selectable object to generate a set of hits, creating a set of links to said set of hits to control said main window without losing context,
  displaying said context in said separate quick browse window within said main window in a hypertext markup language format, with an entry in said separate quick browse window for each item in said set of hits;
  responsive to user selection of an item in said separate quick browse window, executing paging controls for redirecting said main window to a linked page for displaying in said main window a page in collaboration space linked to said item;
  implementing said object as a room in said collaboration space:
  implementing said quick browse selector as a remote control selector in a search results window;
  responsive to user selection of a link to a target page in said separate quick browse window, reloading said main window with said target page;

displaying said separate quick browse window in minimal screen space while said user browses target pages and allowing said user to see and access local settings of said target page so as to display context of said target page, wherein said context of said target page selectively includes a table of contents location, folder, parent, and ancestors of said target page; and organizing said collaboration space according to an object model selectively including place, room, folder, page, member, form, field, placetype, roomtype, skin, and placebot objects.

2. The method of claim 1, further comprising the step of implementing said quick browse selector as a remote control selector in a what's new window.

3. The method of claim 2, further comprising the step responsive to user selection of said quick browse selector of enabling random access browsing of links in said separate quick browse window.

4. The method of claim 3, said links being to objects in a plurality of rooms.

5. The method of claim 1, further comprising the step of implementing said quick browse selector as "go there" links from a tutorial window and as "go there" links from a help window.

6. A system for browsing within collaboration space, comprising:

a browser interface to said collaboration space for displaying a main window and a separate, floating quick browse window;

a remote control mechanism displayed in said browser interface supporting a quick browse feature; said remote control mechanism for opening and displaying in said separate, floating quick browse window, responsive to a user initiated search of an object in said collaboration space or of a what's new subset of said object, links to linked pages resulting from hits from said search; said object implemented as a room in said collaboration space, and said remote control mechanism implemented as a remote control selector in a search results window;

said separate, floating quick browse window displaying said links in a hypertext markup language format;

said quick browse feature redirecting said main window to a linked page in collaboration space upon user selection of a link from said separate, floating quick browse window, said linked page reloaded to said main window for display in said main window of a page in collaboration space;

said separate, floating quick browse window displayed in minimal screen space while user browses target pages to allow said user to see and access local settings of said target page so as to display context of said target page, wherein said context selectively includes a table of contents location, folder, parent, and ancestors of said target page; and said collaboration space organized according to an object model selectively including place, room, folder, page, member, form, field, placetype, roomtype, skin, and placebot objects.

7. The system of claim 6, said context including search results and what's new contexts.

8. The system of claim 7, said context including help and tutorial windows.

9. A program storage solid medium readable by a machine, tangibly embodying a program of instructions executable by a machine to perform method steps for browsing in collaboration space, said method steps comprising:

presenting to a user a browser interface to said collaboration space;

responsive to said user opening in said browser interface a main window selectively including context resulting from entry of a search of a selectable object in said collaboration space or in a what's new subset of said collaboration space, presenting a quick browse selector and results of said search in said main window;

responsive to user selection of said quick browse selector, opening a separate quick browse window;

searching said selectable object to generate a set of hits, creating a set of links to said set of hits to control said main window without losing context, displaying said context in said separate quick browse window within said main window in a hypertext markup language format, with an entry in said separate quick browse window for each item in said set of hits;

responsive to user selection of an item in said separate quick browse window, executing paging controls for redirecting said main window to a linked page for displaying in said main window a page in collaboration space linked to said item;

implementing said object as a room in said collaboration space:

implementing said quick browse selector as a remote control selector in a search results window;

responsive to user selection of a link to a target page in said separate quick browse window, reloading said main window with said target page;

displaying said separate quick browse window in minimal screen space while said user browses target pages and allowing said user to see and access local settings of said target page so as to display context of said target page, wherein said context of said target page selectively includes a table of contents location, folder, parent, and ancestors of said target page; and organizing said collaboration space according to an object model selectively including place, room, folder, page, member, form, field, placetype, roomtype, skin, and placebot objects.

10. A computer implemented method for presenting to a browser user items selected from collaboration space, comprising:

presenting to said user an interface to said collaboration space, said interface including a search selector and a what's new selector;

responsive to user selection of said search selector and entry of a search argument, searching said collaboration space to generate a first set of hits;

responsive to user selection of said what's new selector searching said collaborations space for new objects in said collaboration space to generate a second set of hits;

selectively presenting said first set of hits or said second set of hits and a quick browse selector to said user in a main window of said interface;

responsive to user selection of said quick browse selector, opening and selectively presenting to said user in a separate, floating quick browse window of said interface said first set of hits or said second set of hits as selector items wherein said first set of hits or said second set of hits are displayed in a hypertext markup language format;

responsive to user selection of a selector item in said separate, floating quick browse window, executing paging controls for redirecting said main window to a linked to page in collaboration space f or presenting to said user in said main window an object linked to said selector item while maintaining said selector items in said separate, floating quick browse window;

implementing said object as a room in said collaboration space;

implementing said quick browse selector as a remote control selector in a search results window;

responsive to user selection of a link to a target page in said separate, floating quick browse window, reloading said main window with said target page;

displaying said separate floating, quick browse widow in minimal screen space while said user browses target pages and allowing said user to see and access local settings of said target page so as to display context of said target page, wherein said context selectively includes a table of contents location, folder, parent, and ancestors of said target page; and organizing said collaboration space according to an object model selectively including place room, folder, page, member, form, field, placetype, roomtype, skin, and placebot objects.

* * * * *